(12) United States Patent
Nakata et al.

(10) Patent No.: US 11,550,080 B2
(45) Date of Patent: Jan. 10, 2023

(54) OPTICAL LAMINATED MEMBER

(71) Applicant: NIPPON PAINT AUTOMOTIVE COATINGS CO., LTD., Osaka (JP)

(72) Inventors: Yusuke Nakata, Hirakata (JP); Takeki Hosokawa, Hirakata (JP); Kazuhito Kobayashi, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 84 days.

(21) Appl. No.: 16/339,569

(22) PCT Filed: Oct. 6, 2017

(86) PCT No.: PCT/JP2017/036502
§ 371 (c)(1),
(2) Date: Apr. 4, 2019

(87) PCT Pub. No.: WO2018/066697
PCT Pub. Date: Apr. 12, 2018

(65) Prior Publication Data
US 2020/0124772 A1    Apr. 23, 2020

(30) Foreign Application Priority Data
Oct. 7, 2016    (JP) .............................. JP2016-199368

(51) Int. Cl.
*G02B 1/14*    (2015.01)
*B32B 27/30*    (2006.01)
(Continued)

(52) U.S. Cl.
CPC ................ *G02B 1/14* (2015.01); *B32B 27/30* (2013.01); *G02B 1/11* (2013.01); *G02B 5/0294* (2013.01); *B32B 7/023* (2019.01)

(58) Field of Classification Search
CPC .......... G02B 1/14; G02B 1/11; G02B 5/0294; G02B 5/02; B32B 27/30; B32B 7/023;
(Continued)

(56) References Cited

U.S. PATENT DOCUMENTS

2005/0157407 A1    7/2005  Nishida et al.
2008/0138606 A1    6/2008  Yoshihara et al.
(Continued)

FOREIGN PATENT DOCUMENTS

CN            1297827          1/2007
CN          101928481         12/2010
(Continued)

OTHER PUBLICATIONS

"The Study on a Touch Screen with anti-Glare Hard Coating", Information Recording Materials, 2013, vol. 14, No. 3, with English Translation.
(Continued)

*Primary Examiner* — Callie E Shosho
*Assistant Examiner* — Bethany M Miller
(74) *Attorney, Agent, or Firm* — Wenderoth, Lind & Ponack, L.L.P.

(57) ABSTRACT

An optical laminated member having an antiglare hard coat layer and a clear hard coat layer sequentially laminated on at least one side of a transparent polymer substrate, the antiglare hard coat layer being a cured layer of a coating composition for forming an antiglare layer and having continuous random irregularities on its surface, and a ten-point average roughness $Rz_{JIS}$ of a surface of the antiglare hard coat layer is 0.1 to 2 μm, the clear hard coat layer is a cured layer of a clear hard coating composition, the clear hard coat layer is laminated on a part of the antiglare hard coat layer.

9 Claims, 2 Drawing Sheets

(51) Int. Cl.
   *G02B 5/02* (2006.01)
   *G02B 1/11* (2015.01)
   *B32B 7/023* (2019.01)
(58) Field of Classification Search
   CPC ............ B32B 7/02; B32B 3/30; B32B 7/022;
               B32B 27/08; B32B 27/308; B32B
               2307/538; B32B 2307/40; B32B
               2307/732; B32B 2457/20; C09D 133/00;
                                          C09D 201/00
   See application file for complete search history.

(56) References Cited

U.S. PATENT DOCUMENTS

| | | | |
|---|---|---|---|
| 2008/0218865 | A1 | 9/2008 | Iwata et al. |
| 2009/0061165 | A1 | 3/2009 | Iwata et al. |
| 2013/0158140 | A1* | 6/2013 | Lin .................... C09D 7/70 521/54 |
| 2013/0329297 | A1* | 12/2013 | Hayashi ............ G02F 1/133502 359/601 |
| 2014/0211316 | A1* | 7/2014 | Furui .................. B32B 27/36 359/599 |
| 2015/0049261 | A1 | 2/2015 | Kobayashi et al. |
| 2015/0346408 | A1* | 12/2015 | Mizutani ................ B32B 37/12 428/41.5 |
| 2018/0171060 | A1* | 6/2018 | Boghossian ........... C08G 18/44 |

FOREIGN PATENT DOCUMENTS

| | | |
|---|---|---|
| CN | 102033250 | 4/2011 |
| CN | 102033251 | 4/2011 |
| CN | 103245982 | 8/2013 |
| CN | 103534219 | 1/2014 |
| CN | 103858025 | 6/2014 |
| CN | 104145195 | 11/2014 |
| CN | 104459841 | 3/2015 |
| CN | 104487524 | 4/2015 |
| CN | 105388704 | 3/2016 |
| CN | 105446513 | 3/2016 |
| CN | 105705968 | 6/2016 |
| CN | 105939790 | 9/2016 |
| JP | 9-267357 | 10/1997 |
| JP | 2002-189107 | 7/2002 |
| JP | 2009-25384 | 2/2009 |
| JP | 2014-41244 | 3/2014 |
| JP | 2015-57655 | 3/2015 |
| JP | 5925011 | 4/2016 |
| JP | 5925012 | 4/2016 |
| JP | 5945084 | 6/2016 |
| TW | 201003131 | 1/2016 |
| TW | 201601904 | 1/2016 |
| WO | 2005/097483 | 10/2005 |
| WO | 2006/088206 | 8/2006 |
| WO | 2014/109370 | 7/2014 |

OTHER PUBLICATIONS

International Search Report dated Jan. 9, 2018 in International (PCT) Application No. PCT/JP2017/036502.
Office Action dated Jun. 3, 2020 in Korean Application No. 10-2019-7009692 with machine English translation.
International Preliminary Report on Patentability dated Apr. 18, 2019 in International (PCT) Application No. PCT/JP2017/036502.
Extended European Search Report dated Aug. 17, 2020 in corresponding European Patent Application No. 17858533.7.

* cited by examiner

OPTICAL LAMINATED MEMBER

TECHNICAL FIELD

The present invention relates to optical laminated members.

BACKGROUND ART

Displays are used in a wide variety of fields such as computers, televisions, cellular phones, portable information terminal devices (tablet personal computers, mobile devices, electronic notebooks, etc.), and automobile display panels such as digital meters, instrument panels, navigation devices, console panels, center clusters and heater control panels. In many of such displays, an antiglare (AG) layer, which roughens the surface of a display, is provided on the display surface. By providing an antiglare layer on the surface of a display, it is possible to irregularly reflect external light by irregularities on the surface of the antiglare layer and thereby blur the contour of an image reflected on the display surface. This makes it possible to reduce the visibility of the reflected image on the display surface and to eliminate obstacles to screen visibility due to reflection of the reflected image at the time of using the display.

Displays like those mentioned above (e.g., a liquid crystal display) commonly have an image display unit and an image non-display unit. For example, when a display is incorporated in another peripheral member and an antiglare layer is provided on the display surface, some methods for forming the antiglare layer will allow the antiglare layer to be formed on both an image display unit and an image non-display unit. On the other hand, in many automobile display panels or the like, their image non-display units have a deep color such as black for reasons such as exuding a sense of high quality while maintaining a sense of unity with other automobile interior peripheral members. In automobile display panels, forming an antiglare layer also in a deep color part that is an image non-display unit may reduce a glossy feeling and a sense of high quality of the deep color part.

JP2014-41244 A (Patent Literature 1) discloses that a laminated film for molding characterized in that a hard coat layer having a crack elongation of 5% or more and a low refractive index layer having a refractive index of 1.47 or less are provided in this order on a substrate film. This laminated film for molding is described as having a lower luminous reflectance, a reduced reflection of external light or a reduced sense of glare as well as a reduced whitishness and a high transmittance. On the other hand, the laminate film for molding disclosed in Patent Literature 1 fails to provide both the antiglare performance required in the image display unit of a display (for example, a liquid crystal display) and the design property required in the image non-display unit.

JP2015-57655 A (Patent Literature 2) discloses an antiglare hard coat film having an antiglare hard coat layer containing fine particles on at least one side of a transparent plastic film substrate. With regard to the antiglare hard coat film, the total haze value of the antiglare hard coat film and the surface roughness of the antiglare hard coat layer are required to be within specific ranges. This antiglare hard coat film is described as having an extremely low haze and a superior antiglare property, preventing white blur, and being superior in blackness at the time of black display. On the other hand, like Patent Literature 1, this antiglare hard coat film also fails to provide both the antiglare performance required in the image display unit of a display and the design property required in the image non-display unit.

CITATION LIST

Patent Literature

Patent Literature 1: JP2014-41244 A
Patent Literature 2: JP2015-57655 A

SUMMARY OF THE INVENTION

Technical Problems

The present invention intends to solve the conventional problems and an object thereof is to provide an optical laminated member that provides both antiglare performance required in an image display unit of a display and a design property required in an image non-display unit.

Solution to Problems

In order to solve the above-described problems, the present invention provides the following embodiments.

[1]
An optical laminated member in which an antiglare hard coat layer and a clear hard coat layer are sequentially laminated on at least one side of a transparent polymer substrate,
wherein the antiglare hard coat layer is a cured layer of a coating composition for forming an antiglare layer and has continuous random irregularities on its surface,
a ten-point average roughness $Rz_{JIS}$ of a surface of the antiglare hard coat layer is 0.1 μm to 2 μm,
the clear hard coat layer is a cured layer of a clear hard coating composition,
the clear hard coat layer is laminated on a part of the antiglare hard coat layer,
the antiglare hard coat layer has a thickness of 1 μm to 10 μm,
the clear hard coat layer has a thickness of 0.01 μm to 10 μm,
the antiglare hard coat layer has a haze value Ha of 2% to 45% and an internal haze value Hi of 0.01% to 2%,
the haze value Hm of a part where the clear hard coat layer is laminated on the antiglare hard coat layer is 0.05% to 20%, and
Ha and Hm satisfy the following formulas:

$$5 \le (Ha-Hm)/Ha \times 100 \le 99.$$

[2]
In one embodiment, with regard to the optical laminated member,
the coating composition for forming an antiglare layer contains a first component and a second component, and
the surface irregularities of the antiglare hard coat layer are surface irregularities derived from phase separation between the first component and the second component.

[3]
In one embodiment, with regard to the optical laminated member,
the first component contains at least one species selected from polyfunctional (meth)acrylate compounds and polyfunctional urethane (meth)acrylate compounds, and
the second component is an unsaturated double bond-containing acrylic copolymer.

[4]

In one embodiment, with regard to the optical laminated member, a mass ratio of the first component to the second component is within a range of the first component: the second component=98.5:1.5 to 60:40.

[5]

In one embodiment, with regard to the optical laminated member, the antiglare hard coat layer has a surface free energy of 30 mN/m to 50 mN/m, and a contact angle of a droplet formed when the clear hard coating composition is dropped onto the surface of the antiglare hard coat layer is within a range of 5° to 75°.

[6]

In one embodiment, with regard to the optical laminated member, the clear hard coating composition has a viscosity of 2 mPa·s to 2000 mPa·s at 20° C.

[7]

In one embodiment, with regard to the optical laminated member, the antiglare hard coat layer and the clear hard coat layer are sequentially laminated on one side of the transparent polymer substrate, and a decorative layer is laminated on another side of the transparent polymer substrate.

[8]

In one embodiment, the optical laminated member is an optical laminated member to be disposed in a display unit, the antiglare hard coat layer and the clear hard coat layer are sequentially laminated on one side of the transparent polymer substrate, and the other side of the transparent polymer substrate or a decorative layer laminated on the other side of the transparent polymer substrate is to be disposed so as to face a surface of the display unit.

[9]

In one embodiment, the optical laminated member is an optical laminated member for an in-vehicle device touch panel display.

[10]

The present invention also provides a method for producing an optical laminated member, the method including:

a step of applying a coating composition for forming an antiglare layer onto a side of a transparent polymer substrate and then curing the coating composition to form an antiglare hard coat layer having continuous random irregularities on its surface, a step of applying a clear hard coating composition onto a part of the antiglare hard coat layer obtained and then curing the clear hard coating composition to form a clear hard coat layer on the part of the antiglare hard coat layer, wherein a ten-point average roughness $Rz_{JIS}$ of a surface of the antiglare hard coat layer is 0.1 µm to 2 µm, the antiglare hard coat layer has a thickness of 1 µm to 10 µm, the clear hard coat layer has a thickness of 0.01 µm to 10 µm, the antiglare hard coat layer has a haze value Ha of 2% to 45% and an internal haze value Hi of 0.01% to 2% the haze value Hm of a part where the clear hard coat layer is laminated on the antiglare hard coat layer is 0.05% to 20%, and Ha and Hm satisfy the following formulas:

$5 \leq (Ha-Hm)/Ha \times 100 \leq 99.$

[11]

One embodiment of the present invention is the above-mentioned optical laminated member, wherein the coating composition for forming an antiglare layer contains a polymerizable unsaturated group-containing binder component, the antiglare hard coat layer is a layer on a surface of which a bumpy shape has been formed by bringing a mold base having a bumpy shape on a surface thereof into surface contact with an uncured coating layer of the coating composition for forming an antiglare layer and then removing the mold base.

[12]

One embodiment of the present invention is the above-mentioned optical laminated member, wherein the antiglare hard coat layer is a layer on a surface of which a bumpy shape has been formed by curing an uncured coating layer of the coating composition for forming an antiglare layer with a mold base having a bumpy shape on its surface being kept in surface contact with the uncured coating layer and then removing the mold base.

[13]

The present invention also provides a method for producing an optical laminated member, the method including:

a step of applying a coating composition for forming an antiglare layer containing a polymerizable unsaturated group-containing binder component onto a side of a transparent polymer substrate and then curing the uncured coating layer with a mold base having a bumpy shape on its surface being kept in surface contact with the uncured coating layer, and then removing the mold base to form an antiglare hard coat layer having continuous random irregularities on its surface, a step of applying a clear hard coating composition onto a part of the antiglare hard coat layer obtained and then curing the clear hard coating composition to form a clear hard coat layer on the part of the antiglare hard coat layer, wherein a ten-point average roughness $Rz_{JIS}$ of a surface of the antiglare hard coat layer is 0.1 µm to 2 µm, the antiglare hard coat layer has a thickness of 1 µm to 10 µm, the clear hard coat layer has a thickness of 0.01 µm to 10 µm, the antiglare hard coat layer has a haze value Ha of 2% to 45% and an internal haze value Hi of 0.01% to 2% the haze value Hm of a part where the clear hard coat layer is laminated on the antiglare hard coat layer is 0.05% to 20%, and Ha and Hm satisfy the following formulas:

$5 \leq (Ha-Hm)/Ha \times 100 \leq 99.$

Advantageous Effects of Invention

The optical laminated member of the present invention provides superior antiglare performance in an image display unit of a display while the antiglare performance is reduced in an image non-display unit and the member can provide a design with a high quality feeling. The optical laminated member of the present invention is characterized in that it provides both antiglare performance required in an image display unit of a display and a design property required in an image non-display unit.

DESCRIPTION OF EMBODIMENTS

The optical laminated member of the present invention is a member in which an antiglare hard coat layer and a clear hard coat layer are sequentially laminated on at least one side of a transparent polymer substrate. This is characterized in that the antiglare hard coat layer is a cured layer of a coating composition for forming an antiglare layer and has continuous random irregularities on its surface, a ten-point average roughness $Rz_{JIS}$ of a surface of the antiglare hard coat layer is 0.1 µm to 2 µm, the clear hard coat layer is a cured layer of a clear hard coating composition, the clear hard coat layer is laminated on a part of the antiglare hard coat layer, the antiglare hard coat layer has a thickness of 1 µm to 10 µm, the clear hard coat layer has a thickness of 0.01 µm to 10 µm, the antiglare hard coat layer has a haze value Ha of 2% to 45% and an internal haze value Hi of 0.01% to 2% the haze value Hm of a part where the clear hard coat layer is laminated on the antiglare hard coat layer is 0.05% to 20%, and Ha and Hm satisfy the following formulas:

$$5 \leq (Ha-Hm)/Ha \times 100 \leq 99.$$

The "continuous random irregularities" on the surface of an antiglare hard coat layer referred to herein means a bumpy shape that is a continuous irregular bumpy shape having a size large enough to exhibit antiglare performance and is formed through the application and the curing of a coating composition. That is, the surface irregularities of the antiglare hard coat layer in the present invention are not intended to have a regular surface shape that is formed by, for example, a cutting method.

Figure 1:
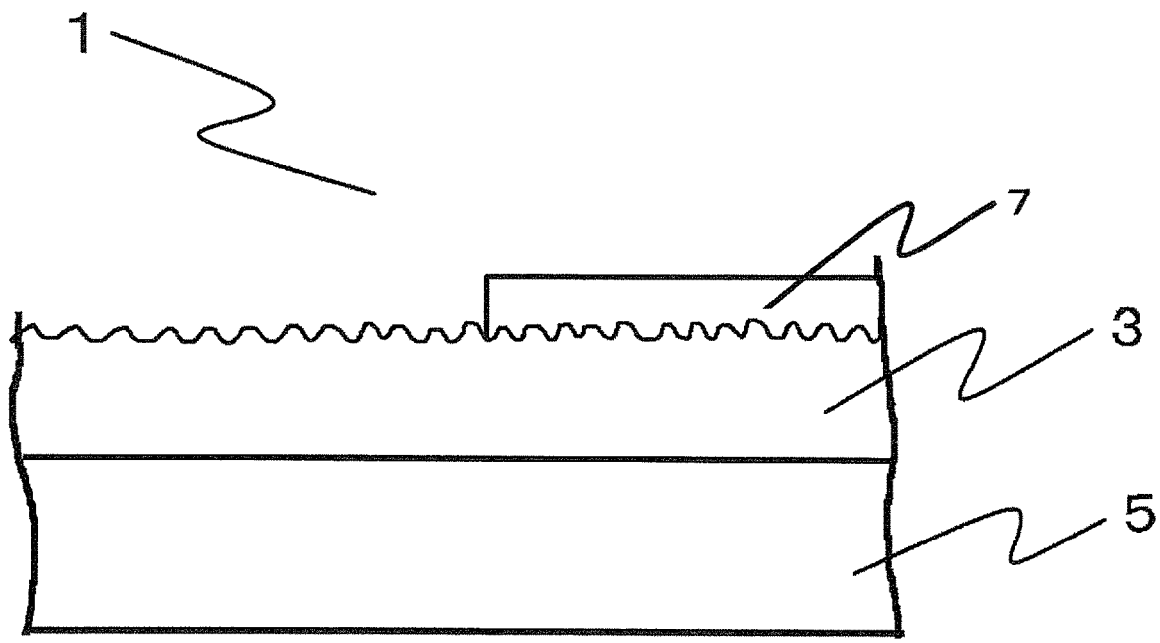
FIG. 1 is a schematic illustration of an optical laminated member of the present invention.

FIG. 1 is a schematic view of an optical laminated member of the present invention. As schematically shown in FIG. 1, in an optical laminated member 1 of the present invention, an antiglare hard coat layer 3 is laminated on at least one side of a transparent polymer substrate 5. Then, a clear hard coat layer 7 is laminated on a part of the antiglare hard coat layer 3. Configurations, etc. will be described in detail below.

Transparent Polymer Substrate

Examples of the transparent polymer substrate to be used in the present invention include substrates made of transparent polymers such as films of polycarbonate, films of polyester, such as polyethylene terephthalate and polyethylene naphthalate; films of cellulose, such as diacetyl cellulose and triacetyl cellulose; and films of acrylic substance, such as polymethyl methacrylate. Examples of the transparent polymer substrate in the present invention also include substrates made of transparent polymers such as films of styrene-based substances, such as polystyrene and acrylonitrile-styrene copolymers; films of olefin-based substances such as polyvinyl chloride, polyethylene, polypropylene, polyolefins having a cyclic or norbornene structure, and ethylene-propylene copolymers; and films of amide-based substances such as nylon and aromatic polyamides.

Furthermore, examples of the transparent polymer substrate to be used in the present invention also include substrates made of transparent polymers such as polyimide, polysulfone, polyether sulfone, polyether ether ketone, polyphenylene sulfide, polyvinyl alcohol, polyvinylidene chloride, polyvinyl butyral, polyallylate, polyoxymethylene, epoxy resins, and blends of these polymers.

Further, the transparent polymer substrate may be a laminate of a plurality of substrates made of transparent polymers. For example, the transparent polymer substrate may be a laminate of a film of an acrylic resin and a film of a polycarbonate-based resin or a laminate of sheets.

As the transparent polymer substrate in the present invention, a substrate with low optical birefringence, a substrate with a phase difference controlled to ¼ of a wavelength (e.g., 550 nm), i.e., λ/4, or ½ of a wavelength, i.e., λ/2, or a substrate with uncontrolled birefringence can be selected from polymer substrates according to the use of the optical laminated member.

The thickness of the transparent polymer substrate can be appropriately chosen according to the use of the optical laminated member, the method of processing the member, etc. In general, in view of strength and workability such as handleability, the thickness may be about 10 µm to 5000 µm, in one embodiment 20 µm to 3000 µm, and in another embodiment 30 µm to 3000 µm.

Antiglare Hard Coat Layer

The optical laminated member of the present invention has an antiglare hard coat layer on at least one side of a transparent polymer substrate. The antiglare hard coat layer is formed by applying a coating composition for forming an antiglare layer on at least one side of a transparent polymer substrate and then curing it. The antiglare hard coat layer is a layer having irregularities on its surface. By having irregularities on the surface, the performance of preventing reflection of the background on the layer surface is exhibited.

In the optical laminated member of the present invention, the antiglare hard coat layer has a thickness (film thickness) of 1 µm to 10 µm. Based on the condition that the thickness of the antiglare hard coat layer is within the above range, the smoothness of the coating film is improved and the antiglare performance is reduced in the part where the clear hard coat layer is provided on the antiglare hard coat layer. This leads to the advantage that it is possible to effectively recover a mirror surface feeling, a glossy feeling, etc. in the part where the clear hard coat layer is provided on the antiglare hard coat layer. When the thickness (film thickness) of the antiglare hard coat layer exceeds 10 µm, the smoothness of the coating film may not improve in the part where the clear hard coat layer is provided on the antiglare hard coat layer, and the antiglare performance reduction effect may not be obtained. In addition, when the thickness (film thickness) of the antiglare hard coat layer is less than 1 µm, sufficient antiglare performance may not be exhibited by the antiglare hard coat layer.

In this specification, the thickness of the antiglare hard coat layer is determined by measuring the thickness of the layer at 10 concave portions and 10 convex portions and calculating the average value thereof. The film thickness can be measured by precipitating a cross section using an instrument such as a microtome and observing the cross section with a laser microscope.

The antiglare hard coat layer has a ten-point average roughness $Rz_{JIS}$ of the layer surface within the range of 0.1 µm to 2 µm. Here, the "ten-point average roughness $Rz_{JIS}$" is a kind of parameter that indicates the bumpy shape (roughness shape) of the surface defined in Appendix JA of JIS B0601; 2001. The ten-point average roughness $Rz_{JIS}$ is the sum total of the average of the peak heights of from the highest mountain peak (projection) to the fifth highest peak and the average of the valley depths of from the deepest valley (recess) to the fifth deepest valley, in a roughness curve with a reference length obtained by applying a cut-off value phase compensation band pass filter. The ten-point average roughness $Rz_{JIS}$ can be determined, for example, by using a laser microscope in accordance with the provision of JIS B0601; 2001.

In the antiglare hard coat layer, the average length RSm of the roughness curve element of the layer surface may be 20 µm to 200 µm. Here, the "average length RSm of the roughness curve element" is a kind of parameter that indicates the size and the distribution of the bumpy shape (roughness shape) of the surface defined in JIS B0601; 2001. The average length RSm of the roughness curve element means the average length of the contour curve (roughness curve) element at the reference length. The average length RSm of the roughness curve element is determined by using a laser microscope (for example, VK-8700 produced by KEYENCE) in accordance with the provision of JIS B0601; 2001.

The antiglare hard coat layer has a haze value Ha of 2% to 45% and an internal haze value Hi of 0.01% to 2%. Based on the condition that the haze value Ha is within the above range, the antiglare performance required in the display unit is exhibited. Based on the condition that the internal haze value Hi is within the above range, it is possible to obtain a design superior in glossy feeling and sense of high quality in the part where the clear hard coat is laminated on the antiglare hard coat layer.

Here, the "haze value Ha" is the haze value of the entire antiglare hard coat layer including the bumpy shape of its surface, that is, the total haze value. In addition, the "internal haze value Hi" is a haze value that is not affected by the bumpy shape of the surface of the antiglare hard coat layer, and is a haze value derived from the component itself constituting the layer. The haze value Ha and the internal haze value Hi can be measured by a method in accordance with JIS K7136 using a haze meter (NDH 2000, produced by Nippon Denshoku Industries Co., Ltd.). Specifically, the haze value Ha (total haze value) of the antiglare hard coat layer is measured in accordance with JIS K7136 using a haze meter.

Thereafter, 0.01 ml of glycerin is dropped onto the surface of the antiglare hard coat layer, and then a glass plate is placed thereon. As a result, the bumpy shape of the surface of the antiglare hard coat layer is crushed, so that the surface of the antiglare hard coat layer is flattened. The internal haze value Hi can be obtained by measuring the haze value in this state in accordance with JIS K7136 using a haze meter.

Coating Composition for Forming Antiglare Layer

The coating composition for forming an antiglare layer to be used for forming an antiglare hard coat layer may be a radiation-curable coating composition for forming an antiglare layer from, for example, the viewpoint that superior hardness can be obtained. In one embodiment, the coating composition for forming an antiglare layer to be used for forming an antiglare hard coat layer may be an ultraviolet-curable coating composition for forming an antiglare layer.

The radiation-curable coating composition for forming an antiglare layer contains a resin component for forming a coating layer. As such a resin component, a radiation-curable component may be contained. The radiation-curable component is a monomer, oligomer, or polymer that can be crosslinked and cured by radiation (e.g., ultraviolet rays). Specific examples of such a radiation-curable component include a monomer, oligomer or polymer having at least one unsaturated double bond group. More specifically, a (meth) acrylate monomer, a (meth)acrylate oligomer, a (meth)acrylate polymer, a urethane (meth)acrylate monomer, a urethane (meth)acrylate oligomer, a urethane (meth)acrylate polymer, which each have at least one unsaturated double bond group, as well as modified monomers, oligomers, and polymers thereof are indicated. Here, "(meth)acrylate" means acrylate and/or methacrylate.

From the viewpoint that the crosslinking density after curing can be increased, the effect of improving surface hardness can be enhanced and the effect of improving transparency can be enhanced, the radiation-curable component in the present invention may contain at least one species selected from polyfunctional (meth)acrylate compounds and polyfunctional urethane (meth)acrylate compounds, such as polyfunctional (meth)acrylate compounds including polyfunctional (meth)acrylate monomers, polyfunctional (meth)acrylate oligomers or polyfunctional (meth)acrylate polymers; and polyfunctional urethane (meth) acrylate compounds including polyfunctional urethane (meth)acrylate monomers, polyfunctional urethane (meth)acrylate oligomers and polyfunctional urethane (meth)acrylate polymers.

As the (meth)acrylate monomer or oligomer having at least one unsaturated double bond group, a commercially available product may be used. Examples of such a commercially available product include methyl (meth)acrylate, ethyl (meth)acrylate, n-butyl (meth)acrylate, isobutyl (meth) acrylate, 2-ethylhexyl (meth)acrylate, acrylic acid, methacrylic acid, isostearyl (meth)acrylate, ethoxylated o-phenylphenol acrylate, methoxypolyethylene glycol acrylate, methoxypolyethylene glycol acrylate, phenoxypolyethylene glycol acrylate, 2-acryloyloxyethyl succinate, 2-hydroxyethyl (meth)acrylate, 2-hydroxypropyl (meth)acrylate, ethylene glycol mono(meth)acrylate, propylene glycol mono (meth)acrylate, 2-hydroxy-3-methoxypropyl (meth)acrylate, N-methylol(meth)acrylamide, and N-hydroxy(meth) acrylamide.

As the polyfunctional (meth)acrylate monomer or oligomer, a commercially available product may be used. As such a commercially available product, for example, DPHA (produced by Daicel-Allnex Ltd.), PETRA (produced by Daicel-Allnex Ltd., pentaerythritol triacrylate), PETIA (produced by Daicel-Allnex Ltd.), ARONIX M-403 (produced by Toagosei Co., dipentaerythritol penta and hexaacrylate), ARONIX M-402 (produced by Toagosei Co., dipentaerythritol penta and hexaacrylate), ARONIX M-400 (produced by Toagosei Co., Ltd., dipentaerythritol penta and hexaacrylate), SR-399 (produced by Sartomer, dipentaerythritol hydroxypentaacrylate), KAYARAD DPHA (produced by Nippon Kayaku Co., Ltd.), KAYARAD DPHA-2C (produced by Nippon Kayaku Co., Ltd.), ARONIX M-404, M-405, M-406, M-450, M-305, M-309, M-310, M-315, M-320, TO-1200, TO-1231, TO-595, TO-756 (produced by Toagosei Co., Ltd.), KAYARD D-310, D-330, DPHA, DPHA-2C (produced by Nippon Kayaku Co., Ltd.), NIKALAC MX-302 (produced by Sanwa Chemical Co., Ltd.), etc. can be used.

Examples of the monofunctional or polyfunctional (meth) acrylate polymer include high molecular weight compounds of the above-described monofunctional or polyfunctional (meth)acrylate monomers or oligomers.

As the polyfunctional urethane (meth)acrylate monomer or oligomer, a commercially available product may be used. As such a commercially available product, bifunctional urethane (meth)acrylates ("UX-2201", "UX-8101" and "UX-6101" produced by Nippon Kayaku Co., Ltd., "UF-8001" and "UF-8003" produced by Kyoeisha Chemical Co., Ltd., "Ebecryl 244", "Ebecryl 284", "Ebecryl 2002", "Ebecryl 4835", "Ebecryl 4883", "Ebecryl 8807", and "Ebecryl 6700" produced by Daicel-Allnex Ltd.); trifunctional urethane (meth)acrylates ("Ebecryl 254", "Ebecryl 264" and "Ebecryl 265" produced by Daicel-Allnex Ltd.); tetrafunctional urethane (meth)acrylates ("Ebecryl8210" produced by Daicel-Allnex Ltd.); hexafunctional urethane (meth)acrylates ("Ebecryl 1290k", "Ebecryl 5129", "Ebecryl 220", "KRM8200" and "Ebecryl 1290N" produced by Daicel-Allnex Ltd.); nonafunctional urethane (meth)acrylates ("KRM 7804" produced by Daicel-Allnex Ltd.); decafunctional urethane (meth)acrylates ("KRM 8452" and "KRM 8509" produced by Daicel-Cytec Co., Ltd.); and pentadecafunctional urethane (meth)acrylates ("KRM 8655" produced by Daicel-Allnex Ltd.), etc. can be used.

The monofunctional or polyfunctional urethane (meth) acrylate monomers or oligomers can be prepared, for example, by reacting a polycarbonate diol, a (meth)acrylate compound containing a hydroxyl group and an unsaturated double bond group in the molecule thereof, and a polyisocyanate.

Examples of the monofunctional or polyfunctional urethane (meth)acrylate polymer include high molecular weight compounds of the above-described monofunctional or polyfunctional urethane (meth)acrylate monomers or oligomers.

One embodiment of the coating composition for forming an antiglare layer is an embodiment where the coating composition for forming an antiglare layer contains a first component and a second component. In this case, the surface irregularities of the antiglare hard coat layer are surface irregularities formed by the phase separation of the first component and the second component. The combination of the first component and the second component that generate the above-mentioned phase separation may be an embodiment where the SP value of the first component ($SP_1$) and the SP value of the second component ($SP_2$) satisfy the following conditions:

$$SP_2 < SP_1$$

$$SP_1 - SP_2 \geq 0.5.$$

In one embodiment, a hard coating composition for forming an antiglare layer containing a first component and a second component satisfying the above conditions is applied to a substrate, the first component and the second component undergo phase separation based on the difference in SP value of the first component and the second component. Thus, a coating film having continuous random irregularities on a surface thereof can be formed.

The SP value is an abbreviation of solubility parameter and is a measure of solubility. The larger the SP value, the higher the polarity, while the smaller the value thereof, the lower the polarity.

For example, the SP value can be measured by the following method [reference: SUH, CLARKE, J.P.S.A-1, 5, 1671-1681 (1967)].

Measurement Temperature: 20° C.

A sample: 0.5 g of resin is weighed in a 100 ml beaker, 10 ml of a good solvent is added with a volumetric pipette, and the sample is dissolve with a magnetic stirrer.

Solvent:
Good solvent . . . dioxane, acetone, etc.
Poor solvent . . . n-hexane, ion exchanged water, etc.

Clouding point measurement: A poor solvent is dropped using a 50 ml burette, and the point at which turbidity occurs is taken as the amount of dripping.

The SP value δ of resin is given by the following equations.

$$\delta = (V_{ml}^{1/2}\delta_{ml} + V_{mh}^{1/2}\delta_{mh})/(V_{ml}^{1/2} + V_{mh}^{1/2}) \quad \text{[Expression 1]}$$

$$V_m = V_1 V_2/(\phi_1 V_2 + \phi_2 V_1) \quad \text{[Expression 2]}$$

$$\delta_m = \phi_1 \delta_1 + \phi_2 \delta_2 \quad \text{[Expression 3]}$$

Vi: the molecular volume of the solvent (ml/mol)
φi: the volume fraction of each solvent at the clouding point
δi: the SP value of the solvent
ml: low SP poor solvent mixed system
mh: high SP poor solvent mixed system In one embodiment, the difference between the SP value of the first component and the SP value of the second component is 0.5 or more, for example, the difference is 0.8 or more. The upper limit of the difference in SP value is not particularly limited, but it is generally 15 or less. When the difference between the SP value of the first component and the SP value of the second component is 0.5 or more, the compatibility of the components is low, whereby phase separation between the first component and the second component is expected to occur after the hard coating composition for forming an antiglare layer is coated.

In this embodiment, the above-described radiation-curable component may be used as the first component. In addition, an unsaturated double bond-containing acrylic copolymer may be used as the second component.

As the first component, a monomer, oligomer or polymer having at least one unsaturated double bond group may be used. Specific examples of the first component include a (meth)acrylate monomer, a (meth)acrylate oligomer, a (meth)acrylate polymer, a urethane (meth)acrylate monomer, a urethane (meth)acrylate oligomer, and a urethane (meth)acrylate polymer, which each have at least one unsaturated double bond group, and modified monomers, oligomers or polymers thereof. The first component may contain at least one species selected from polyfunctional (meth)acrylate compounds and polyfunctional urethane (meth)acrylate compounds, such as a polyfunctional (meth) acrylate monomer, a polyfunctional (meth)acrylate oligomer, a polyfunctional (meth)acrylate polymer, a polyfunctional urethane (meth)acrylate monomer, a polyfunctional urethane (meth)acrylate oligomer, and a polyfunctional urethane (meth)acrylate polymer. Including such a compound leads to the advantage that the crosslinking density after curing can be increased and the effect of increasing surface hardness can be enhanced.

The (meth)acrylate monomer, the urethane (meth)acrylate monomer, the (meth)acrylate oligomer, and the urethane (meth)acrylate oligomer may have a weight-average molecular weight of less than 5,000. For example, the (meth)acrylate monomer and the urethane (meth)acrylate monomer may have a molecular weight of 70 or more and a weight-average molecular weight of less than 3000. In one embodiment, the (meth)acrylate monomer and the urethane (meth)acrylate monomer may have a molecular weight of 70 or more and a weight-average molecular weight of less than 2500. The (meth)acrylate oligomer and the urethane (meth) acrylate oligomer may have a weight-average molecular weight of 100 or more and less than 5000. The (meth) acrylate polymer and the urethane (meth)acrylate polymer may have a weight-average molecular weight of less than 50,000.

Examples of the unsaturated double bond-containing acrylic copolymer, which is the second component, include products prepared by adding a component having an unsaturated double bond and another functional group, such as acrylic acid and glycidyl acrylate, to a resin produced by copolymerizing a (meth)acrylic monomer with another monomer having an ethylenically unsaturated double bond, a resin produced by reacting a (meth)acrylic monomer with another monomer having an ethylenically unsaturated double bond and an epoxy group, a resin produced by reacting a (meth)acrylic monomer with another monomer having an ethylenically unsaturated double bond and an isocyanate group, or the like. Such unsaturated double bond-containing acrylic copolymers may be used singly, or two or more species thereof may be used in combination. The unsaturated double bond-containing acrylic copolymer may have a weight-average molecular weight of 3,000 to 100,000, and in some embodiment 3,000 to 50,000.

The mass ratio of the first component to the second component, the first component:the second component, may be 98.5:1.5 to 60:40, in one embodiment, the mass ratio may be 98.5:1.5 to 85:15. In some embodiment, the mass ratio may be 98:2 to 86:14. By setting the combining ratio to within such a range, it is possible to obtain an antiglare hard coat layer having a desired surface bumpy shape and a desired hardness. Moreover, forming the surface bumpy shape by phase separation between the first component and the second component leads to the advantage that the internal haze value Hi can be designed to a lower value.

In another embodiment of the coating composition for forming an antiglare layer, the coating composition for forming an antiglare layer contains the above-described radiation-curable component and a particulate material. In this embodiment, the bumpy shape of the surface of the antiglare hard coat layer is to be formed due to the particulate material. Examples of the particulate material include inorganic oxide particles, such as silica ($SiO_2$) particles, alumina particles, titania particles, tin oxide particles, antimony-doped tin oxide (abbreviated as ATO) particles, and zinc oxide particles, and organic resin particles, such as polystyrene particles, melamine resin particles, acrylic particles, acrylic-styrene particles, silicone particles, polycarbonate particles, polyethylene particles, and polypropylene particles. Such inorganic oxide particles and organic resin particles may have an average particle diameter of 0.5 to 8 μm, and in one embodiment, an average particle diameter of 0.7 to 6 μm. The average particle diameter of the particulate material referred to herein is a value measured using image processing software from an image taken with a cross-sectional electron microscope.

Another embodiment of the coating composition for forming an antiglare layer may be an embodiment where a polymerizable unsaturated group-containing binder component is contained. The coating composition for forming an antiglare layer containing the polymerizable unsaturated group-containing binder component can be used in the procedure in which a bumpy surface of a mold base having a bumpy shape on its surface is brought into surface contact with an uncured coating layer formed by applying the composition;

subsequently, the uncured coating layer is cured with the mold base being kept in surface contact; and then the mold base is removed to form the antiglare hard coat layer.

In this embodiment, a base with a layer having a bumpy shape on its surface formed by using the coating composition for forming an antiglare layer can be suitably used as a mold base.

As the polymerizable unsaturated group-containing binder component contained in the coating composition for forming an antiglare layer, the above-mentioned polyfunctional (meth)acrylate oligomer, the above-mentioned polyfunctional urethane (meth)acrylate oligomer, the above-described monofunctional or polyfunctional (meth)acrylate polymer, the above-described monofunctional or polyfunctional urethane (meth) acrylate polymer, and mixtures thereof can be used. Specific examples of the polyfunctional (meth)acrylate oligomer and the polyfunctional urethane (meth)acrylate oligomer are the same as those described above.

As the monofunctional or polyfunctional (meth)acrylate polymer and the monofunctional or polyfunctional urethane (meth)acrylate polymer, commercially available products may be used. As commercially available products of the monofunctional or polyfunctional (meth)acrylate polymers, for example, UNIDIC V-6840, UNIDIC V-6841, UNIDIC V-6850, UNIDIC EMS-129, UNIDIC EMS-635 and UNIDIC WHV-649, produced by DIC Corporation can be used.

As such commercially available products of the urethane (meth)acrylate oligomer or polymer, for example, UX series produced by Nippon Kayaku Co., Ltd., UF series and UA series produced by Kyoeisha Chemical Co., Ltd., EBE-CRYL series and KRM series produced by Daicel-Cytec Co., Ltd.; Shikoh UV series produced by The Nippon Synthetic Chemical Industry Co., Ltd.; CN series produced by Sartomer; U series produced by Shin-Nakamura Chemical Co., Ltd.; and Art-Resin UN series produced by Negami Chemical Industrial Co., Ltd. can be used.

Photopolymerization Initiator

The hard coating composition for forming an antiglare layer of the present invention may contain a photopolymerization initiator. The existence of the photopolymerization initiator causes resin components to be well polymerized by irradiation with active energy rays such as ultraviolet rays. Examples of the photopolymerization initiator include alkylphenone-based photopolymerization initiators, acylphosphine oxide-based photopolymerization initiators, titanocene-based photopolymerization initiators, and oxime ester-based polymerization initiators. Examples of the alkylphenone-based photopolymerization initiators include 2,2-dimethoxy-1,2-diphenylethan-1-one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2-methyl-1-(4-methylthiophenyl)-2-morpholinopropan-1-one, 2-benzyl-2-dimethylamino-1-(4-morpholinophenyl)butanone-1,2-(dimethylamino)-2-[(4-methylphenyl)methyl]-1-[4-(4-morpholinyl)phenyl]-1-butanone. Examples of the acylphosphine oxide-based photopolymerization initiators include 2,4,6-trimethylbenzoyl-diphenyl-phosphine oxide and bis(2,4,6-trimethylbenzoyl)-phenylphosphine oxide. Examples of the titanocene-based photopolymerization initiators include bis(η5-2,4-cyclopentadien-1-yl)-bis(2,6-difluoro-3-(1H-pyrrol-1-yl)-phenyl)titanium. Examples of the oxime ester-based polymerization initiator include 1,2-octanedione, 1-[4-(phenylthio)-, 2-(O-benzoyloxime)], ethanone, 1-[9-ethyl-6-(2-methylbenzoyl)-9H-carbazol-3-yl]-, 1-(O-acetyloxime), oxyphenylacetic acid, 2-[2-oxo-2-phenylacetoxyethoxy]ethyl ester, and 2-(2-hydroxyethoxy)ethyl ester. Such photopolymerization initiators may be used singly, or two or more species thereof may be used in combination.

In one embodiment, among the above-mentioned photopolymerization initiators, 2-hydroxy-2-methyl-1-phenyl-propan-1-one, 1-hydroxy-cyclohexyl-phenyl-ketone, 2-methyl-1-(4-methylthiophenyl)-2-morpholinopropan-1-one, 2-benzyl-2-dimethylamino-1-(4-morpholinophenyl)-butanone-1 and 2,2-dimethoxy-1,2-diphenylethan-1-one may be used.

An amount of the photopolymerization initiator may be 0.01 to 20 parts by mass, and in some embodiment, an amount may be 1 to 10 parts by mass based on 100 parts by mass of the resin component of the hard coating composition for forming an antiglare layer. Such photopolymerization initiators may be used singly or two or more photopolymerization initiators may be used in combination.

Solvent

The hard coating composition for forming an antiglare layer to be used in the present invention may contain a solvent. The solvent is not particularly limited and may be selected appropriately in consideration of the components contained in the composition, the type of the substrate to be coated, the method of applying the composition, etc. Specific examples of solvents that can be used include aromatic solvents such as toluene and xylene; ketone solvents such as methyl ethyl ketone, acetone, methyl isobutyl ketone, and cyclohexanone; ether solvents such as diethyl ether, isopropyl ether, tetrahydrofuran, dioxane, ethylene glycol dimethyl ether, ethylene glycol diethyl ether, diethylene glycol dimethyl ether, diethylene glycol diethyl ether, propylene glycol monomethyl ether, anisole and phenetole; ester solvents such as ethyl acetate, butyl acetate, isopropyl acetate and ethylene glycol diacetate; amide solvents such as dimethylformamide, diethylformamide and N-methylpyrrolidone; cellosolve solvents such as methyl cellosolve, ethyl cellosolve and butyl cellosolve; alcohol solvents such as methanol, ethanol, propanol, isopropyl alcohol, butanol and isobutyl alcohol; and halogen-containing solvents such as dichloromethane and chloroform. Such solvents may be used singly, or two or more species thereof may be used in combination. In one embodiment, of these solvents, ester solvents, ether solvents, alcohol solvents and ketone solvents may be used.

To the hard coating composition for forming an antiglare layer of the present invention may be added various additives, if necessary. Examples of such additives include conventional additives such as antistatic agents, plasticizers, surfactants, antioxidants, ultraviolet absorbers, surface conditioners, and leveling agents.

The hard coating composition for forming an antiglare layer can be prepared by a method commonly practiced by those skilled in the art. For example, it can be prepared by mixing the above-described components by using a commonly used mixing device such as a paint shaker and a mixer.

Formation of Antiglare Hard Coat Layer

In one embodiment of the present invention, the antiglare hard coat layer is formed by applying the hard coating composition for forming an antiglare layer onto a transparent polymer substrate. The method of applying the hard coating composition for forming an antiglare layer may be appropriately selected according to the hard coating composition for forming an antiglare layer and the situation of the application step. For example, the hard coating composition may be applied by a dip coating method, an air knife coating method, a curtain coating method, a roller coating method, a wire bar coating method, a die coating method, an inkjet method, a gravure coating method, or an extrusion coating method (U.S. Pat. No. 2,681,294).

The antiglare hard coat layer is formed by curing the coating film obtained by the application of the hard coating composition for forming an antiglare layer. This curing can be performed by irradiation using a light source that emits radiation (active energy rays) with a required wavelength. As the radiation to be irradiated, for example, light having an integral dose of 50 mJ/cm$^2$ to 1,500 mJ/cm$^2$ can be used. The wavelength of the irradiation light is not particularly limited and, for example, ultraviolet light having a wavelength of 360 nm or less can be used. Such light can be obtained by using a high pressure mercury lamp, an extra-high pressure mercury lamp or the like.

In the present invention, in one embodiment, the antiglare hard coat layer include the embodiment in which the antiglare hard coat layer is a cured layer of the above-described hard coating composition for forming an antiglare layer containing the first component and the second component. In this embodiment, the antiglare hard coat layer comes to have a surface bumpy shape formed by the phase separation between the first component and the second component. Therefore, the haze derived from the layer-forming components in the antiglare hard coat layer (i.e., internal haze) can be designed to be low. This leads to the advantage that the haze value is effectively reduced in the part where the clear hard coat layer is provided on the antiglare hard coat layer and a mirror surface feeling, a glossy feeling, etc. can be effectively enhanced.

In another embodiment of the present invention, a coating composition for forming an antiglare layer containing a polymerizable unsaturated group-containing binder component is applied, then a mold base having a bumpy shape on a surface thereof is brought into surface contact with the resulting uncured coating layer. Then, the mold base is removed, and thus an antiglare hard coat layer on a surface of which a bumpy shape has been formed is formed. In another embodiment of the above embodiment may be, for example, an embodiment in which a coating composition for forming an antiglare layer containing a polymerizable unsaturated group-containing binder component is applied, then the resulting uncured coating layer is cured with a mold base having a bumpy shape on a surface thereof being kept in surface contact with the uncured coating layer. Then the mold base is removed, and thus the antiglare hard coat layer is formed. In this embodiment, the bumpily shaped surface of the mold base is brought into surface contact oppositely with a surface of the uncured coating layer, then the uncured coating layer is cured in the surface contact state, so that a bumpy shape is transferred, and thus a bumpy shape is formed on the surface of the layer. After the curing, the mold base is removed, whereby an antiglare hard coat layer having continuous random irregularities on a surface thereof can be formed. In this embodiment, the applying method and the curing method of the coating composition for forming an antiglare layer may be carried out by the same procedures as those described above.

This embodiment has the advantage that it is possible to form an antiglare hard coat layer having a high hardness while having a bumpy shape on its surface.

As the mold base, a mold base having continuous random irregularities on its surface can be used without limitations. In one embodiment, a base having a layer having a bumpy shape on its surface obtained via the application and curing of the above-described hard coating composition for forming an antiglare layer may be used as the mold base.

Clear Hard Coat Layer

The optical laminated member of the present invention has a clear heart coat layer laminated on a part of the antiglare hard coat layer. The clear hard coat layer is a cured layer of the clear hard coating composition. In the present invention, the clear hard coat layer is required to have a thickness of 0.01 µm to 10 µm.

In the present invention, the clear hard coat layer is laminated on a part of the antiglare hard coat layer. That is, the optical laminated member of the present invention has, on its surface, a part where antiglare performance is exhibited (a part where no clear hard coat layer is provided on the antiglare hard coat layer), and
a part where antiglare performance is not exhibited or is reduced (a part where a clear hard coat layer is provided on the antiglare hard coat layer). In the optical laminated member of the present invention, the haze value Hm of the part where the clear hard coat layer is laminated on the antiglare hard coat layer is 0.05% to 20%, and
Ha and Hm satisfy the following formulas:

$$5 \leq (Ha-Hm)/Ha \times 100 \leq 99.$$

As described above, the present invention has the advantage that by laminating a clear hard coat layer on a part of an antiglare hard coat layer having specific physical property values, it is possible to effectively reduce and control the haze value of the part where the clear hard coat layer is provided.

The haze value Hm of the part where the clear hard coat layer is laminated on the antiglare hard coat layer can be measured by a method in accordance with JIS K7136 using a haze meter (NDH 2000, produced by Nippon Denshoku Industries Co., Ltd.). Specifically, it can be determined by measuring the haze value Hm (total haze value) of the part where the clear hard coat layer is laminated on the antiglare hard coat layer by a method in accordance with JIS K7136 using a haze meter.

In one embodiment, the value of (Ha−Hm)/Ha×100 may be 15 or more and 98 or less, and in some embodiment, the value may be 20 or more and 98 or less.

The clear heat hard coat layer is formed by applying a clear hard coating composition onto a part of the antiglare hard coat layer and then curing it. In one embodiment, the clear hard coating composition may contain the radiation-curable component, the photopolymerization initiator, and the solvent as required. As the radiation-curable component contained in the clear hard coating composition, in one embodiment, at least one monomer, oligomer, or polymer having at least one unsaturated double bond group may be contained.

Examples of the monomer having at least one unsaturated double bond group include the above-mentioned (meth)acrylate monomer and the above-mentioned urethane (meth)acrylate monomer. Examples of the oligomer having at least one unsaturated double bond group include the above-mentioned (meth)acrylate oligomer and the above-mentioned urethane (meth)acrylate oligomer. Examples of the polymer having at least one unsaturated double bond group include the above-mentioned (meth)acrylate polymer and the above-mentioned urethane (meth)acrylate polymer. In one embodiment, the radiation-curable component contained in the clear hard coating composition contains at least one species selected from the above-mentioned polyfunctional (meth) acrylate compounds and polyfunctional urethane (meth)acrylate compounds, such as the above-mentioned polyfunctional (meth)acrylate monomer, polyfunctional (meth)acrylate oligomer, polyfunctional urethane (meth)acrylate monomer, and polyfunctional urethane (meth)acrylate oligomer. Including such a compound leads to the advantage that the crosslinking density after curing can be increased and the effect of increasing surface hardness can be enhanced.

The clear hard coating composition can be prepared in the same manner as the preparation of the hard coating composition for forming an antiglare layer.

The clear hard coat layer is formed by applying a clear hard coating composition onto a part of the antiglare hard coat layer. The method of applying the clear hard coating composition may be chosen appropriately according to the clear hard coating composition and the conditions of the applying process. The clear hard coating composition can be applied, for example, by an inkjet method using an inkjet device, a roller coating method, a wire bar coating method, an air knife coating method, a curtain coating method, a dip coating method, a gravure coating method or an extrusion coating method (U.S. Pat. No. 2,681,294). In one embodiment, an inkjet method as a method of applying the clear hard coating composition may be used, because a clear hard coat layer can be easily provided at a desired position on the antiglare hard coat layer.

In one embodiment, the clear hard coating composition may have a viscosity of 2 mPa·s to 2000 mPa·s at 20° C. The condition that the viscosity of the clear hard coating composition at 20° C. is within the above range has the advantage that the haze value in the part where the clear hard coat layer has been provided can be effectively reduced and controlled.

The viscosity of the clear hard coating composition at 20° C. can be measured with a B type viscometer (TVB-22L, produced by Toki Sangyo Co., Ltd.). Examples of the B type viscometer include TVB-22L (produced by Toki Sangyo Co., Ltd.).

The viscosity of the clear hard coating composition can be adjusted, for example, by changing the solid concentration of the coating composition using a diluting solvent.

In the optical laminated member of the present invention, the antiglare hard coat layer may have a surface free energy of 30 to 50 mN/m, and when the clear hard coating composition is dropped onto the surface of the antiglare hard coat layer, a contact angle of the droplets may be in the range of 5 to 75°.

The contact angle of a droplet when the clear hard coating composition is dropped onto the surface of the antiglare hard coat layer can be determined in accordance with JIS R3257. Specifically, a 2 µl droplet of a clear hard coating composition is dropped onto an antiglare hard coat layer horizontally placed. Next, the droplet of the clear hard coating composition is enlarged and photographed using a CCD camera from the horizontal direction (end-on) with respect to the antiglare hard coat layer surface, and the profile shape of the droplet is analyzed from the obtained image and a contact angle is calculated. Thus, the contact angle can be measured.

The condition that the surface free energy of the antiglare hard coat layer and the contact angle of the clear hard coating composition are within the above ranges has the advantage that when a clear hard coat layer is laminated on a part of the antiglare hard coat layer, a clear hard coat layer having a desired thickness can be conveniently formed at a desired position.

The optical laminated member of the present invention may have a color difference adjusting layer on the antiglare hard coat layer and the clear hard coat layer as required. Examples of the color difference adjusting layer include a low refractive index layer, a high refractive index layer, and a multilayer including a low refractive index layer and a high refractive index layer. The low refractive index layer may be a layer obtained by curing a coating composition containing a commonly used resin component (for example, the above-described radiation-curable component) and metal oxide particles. The high refractive index layer may be a layer obtained by curing a coating composition containing a commonly used resin component (for example, the above-described radiation-curable component) and metal fluoride particles. The overall thickness of the color difference adjusting layers may be 30 nm to 300 nm, and in one embodiment 50 nm to 200 nm. The color difference adjusting layer can be formed by applying the coating composition together with the coating composition for forming an antiglare layer, followed by curing.

Decorative Layer

In an optical laminated member of the present invention, the antiglare hard coat layer and the clear hard coat layer may be sequentially laminated on one side of the transparent polymer substrate, and a decorative layer may be laminated on the other side of the transparent polymer substrate. Such an optical laminated member having a decorative layer can be used, for example, as a laminated member for molding decoration.

Figure 2:
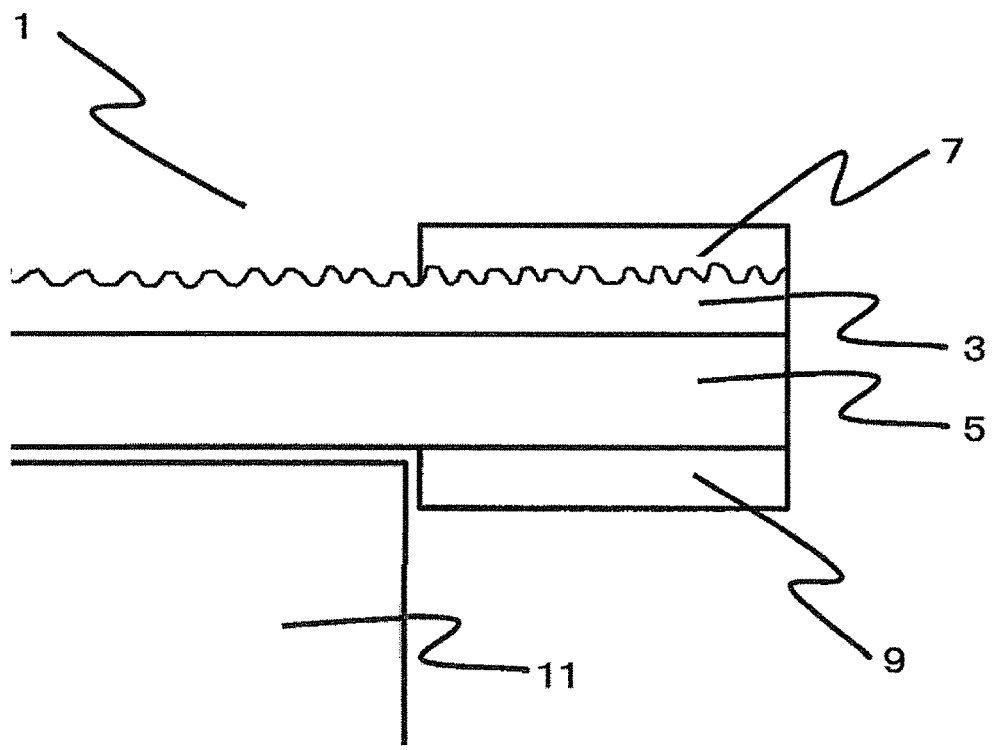
FIG. 2 is a schematic illustration of an optical laminated member of the present invention.

FIG. 2 is a schematic illustration of an optical laminated member having a decorative layer. As schematically illustrated in FIG. 2, an antiglare hard coat layer 3 is laminated on one side of a transparent polymer substrate 5, and a clear hard coat layer 7 is laminated on a part of the antiglare hard coat layer 3. Then, a decorative layer 9 is laminated on the other side of the transparent polymer substrate 5.

Figure 3:
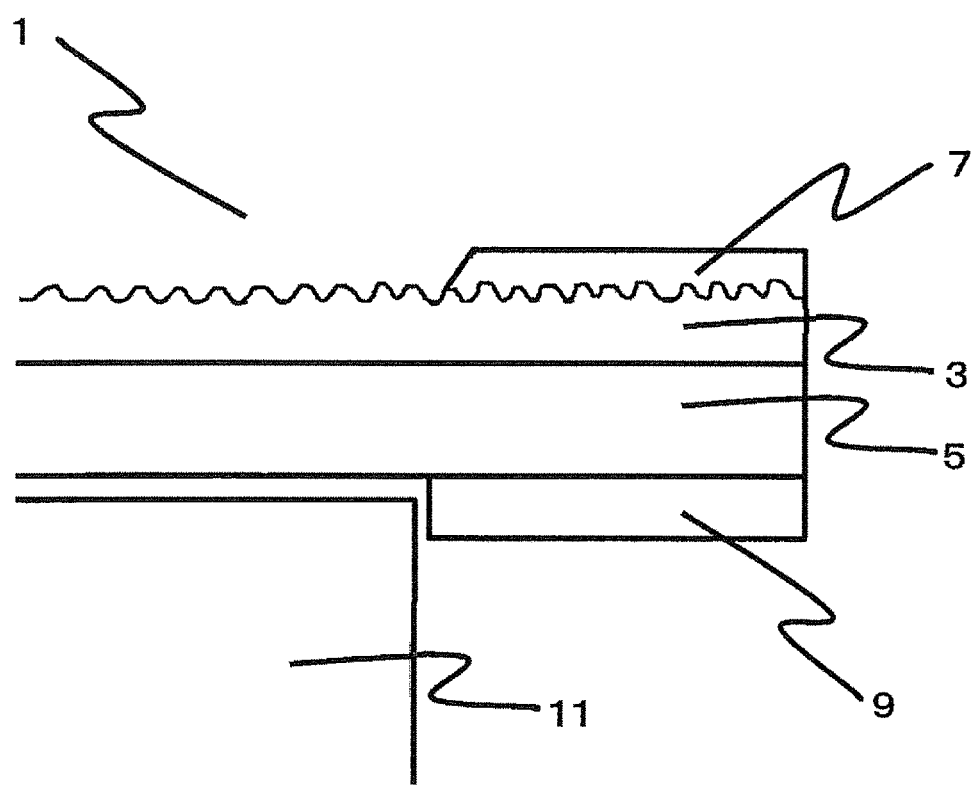
FIG. 3 is a schematic illustration of an optical laminated member of the present invention.

FIG. 3 is a schematic illustration of another embodiment of an optical laminated member having a decorative layer. In the embodiment schematically illustrated in FIG. 3, the clear hard coat layer 7 has a part where the thickness changes, that is, a thickness gradient part. In the thickness gradient part, the haze value changes gradually. For example, as illustrated in FIG. 3, the thickness gradient part of the clear hard coat layer 7 is provided along the boundary of the decorative layer 9 so that the haze value can be gradually changed at the boundary of decoration.

The decorative layer is a layer that decorates a laminate film for molded decoration with patterns, characters, metallic luster or the like. Examples of such a decorative layer include a printed layer or a vapor-deposited layer. Both the printed layer and the vapor-deposited layer are layers for decoration. In the present invention, either one of the printed layer and the vapor-deposited layer may be provided as the decorative layer, or both the printed layer and the vapor-deposited layer may be provided. The printed layer may be a layer composed of a plurality of layers. From the viewpoint of the easiness of a working process and the like, the decorative layer may be a printed layer.

The printed layer is a layer that decorates the surface of a molding with patterns and/or characters, or the like. Examples of the printed layer include patterns composed of woody textures, stone-like textures, cloth-like textures, sand-like textures, geometrical figures, characters, and whole solid. As the material for the printed layer, a colored ink may be used which contains a pigment or dye with a suitable color as a coloring agent, and resins such as polyvinyl-based resins including vinyl chloride/vinyl acetate-based copolymer resins, polyamide-based resins, polyester-based resins, polyacrylic resins, polyurethane-based resins, polyvinyl acetal-based resins, polyester urethane-based resins, cellulose ester-based resins, alkyd resins, and chlorinated polyolefin-based resins as a binder. As the pigment of the ink to be used for the printed layer, for example, the following can be used. Ordinarily, as the pigment, azo pigments such as polyazo, organic pigments such as isoindolinone, or inorganic pigments such as titanium nickel antimony oxide can be used as a yellow pigment;

azo pigments such as polyazo, organic pigments such as quinacridone, or inorganic pigments such as iron red can be used as a red pigment;

organic pigments such as phthalocyanine blue or inorganic pigments such as cobalt blue can be used as a blue pigment; organic pigments such as aniline black can be used as a black pigment; and inorganic pigments such as titanium dioxide can be used as a white pigment.

As the dye of the ink to be used for the printed layer, various known dyes may be used to an extent not impairing the effect of the present invention. As the method of printing the ink, a known printing method such as an offset printing method, a gravure printing method and a screen printing method or a known coating method such as a roll coating method or a spray coating method can be used. In such an embodiment, when a low molecular weight crosslinking compound is not used, but a photocurable resin composition with a constitution where the polymers are crosslinked together is used as in the present invention, surface tackiness is not occurred, there is little trouble in the printing, and the yield is good.

The vapor-deposited layer can be formed by a vacuum vapor deposition method, a sputtering method, an ion plating method, a plating method, or the like using at least one metal selected from the group comprising aluminum, nickel, gold, platinum, chromium, iron, copper, indium, tin, silver, titanium, lead, zinc, etc., or an alloy or compound thereof.

The thickness of the printed layer or the vapor-deposited layer for decoration can be suitably chosen by a method ordinarily used depending on the degree of extension at the time of molding such that a desired surface appearance of a molding can be obtained.

Optical Laminated Member

The optical laminated member of the present invention can be used as a member to be disposed in a display unit. Examples of the display include a liquid crystal display, an organic EL display, and a plasma display. In one embodiment that the optical laminated member of the present invention is disposed in a display unit, the optical laminated member in which the antiglare hard coat layer and the clear hard coat layer are sequentially laminated on one side of the transparent polymer substrate is arranged in such a manner, in addition, the other side of the transparent polymer substrate or a decorative layer laminated on the other side of the transparent polymer substrate faces the surface of the display unit.

The optical laminated member of the present invention can be used, for example, as an optical laminated member for in-vehicle device touch panel displays.

EXAMPLES

The present invention will be described hereafter in more detail by way of examples, to which the present invention is not intended to be limited. In the following examples, all designations of "part(s)" and "%" are on a mass basis, unless otherwise stated.

Preparation Example 1 Preparation of Unsaturated Double Bond-Containing Acrylic Copolymer A mixture of 171.6 parts of isoboronyl methacrylate, 2.6 parts of methyl methacrylate and 9.2 parts of methacrylic acid was mixed. This mixed solution was added dropwise to 330.0 parts of methyl isobutyl ketone contained in a 1,000 ml reaction vessel equipped with a stirring blade, a nitrogen inlet tube, a cooling tube and a dropping funnel and having been heated to 110° C. under a nitrogen atmosphere, at a constant rate over 3 hours together with a solution containing 1.8 parts of tertiary butylperoxy-2-ethyl hexanoate in 80.0 parts of propylene glycol monomethyl ether, and then these were reacted at 110° C. for 30 minutes. Then, a solution containing 0.2 parts of tertiary butylperoxy-2-ethyl hexanoate in 17.0 parts of propylene glycol monomethyl ether was added dropwise. Also, a solution containing 1.4 parts of tetrabutylammonium bromide and 0.1 parts of hydroquinone in 5.0 parts of propylene glycol monomethyl ether was added. A solution of 22.4 parts of 4-hydroxybutyl acrylate glycidyl ether and 5.0 parts of propylene glycol monomethyl ether was added dropwise over 2 hours with air bubbling, followed by further reacting them over 5 hours. An unsaturated double bond-containing acrylic copolymer having a number-average molecular weight of 5,500 and a weight-average molecular weight of 18,000 was obtained. This resin had a Sp value of 10.0.

Example 1

Production of Coating Composition for Forming Antiglare Layer

A reactor containing 13.24 parts of methyl isobutyl ketone, 28.20 parts of isopropyl alcohol and 16.80 parts of isobutanol was charged with 36.98 parts of M-402 (produced by Toagosei Co., Ltd., polyfunctional acrylate monomer mixture mainly composed of dipentaerythritol penta and hexaacrylate) as the first component,
2.52 parts of the unsaturated double bond-containing acrylic copolymer of Preparation Example 1 as the second component and
2.26 parts of a photopolymerization initiator (trade name: Irgacure 184, produced by BASF Japan Ltd.). Furthermore, they were mixed to produce a coating composition for forming an antiglare layer having a solid concentration of 40%.

Production of Clear Hard Coating Composition

A reactor containing 19.72 parts of methyl isobutyl ketone and 44.17 parts of isobutanol was charged with 33.90 parts of M-402 (produced by Toagosei Co., Ltd., polyfunctional acrylate monomer mixture mainly composed of dipentaerythritol penta and hexaacrylate) as a radiation-curable component and
2.21 parts of a photopolymerization initiator (trade name: Irgacure 184, produced by BASF Japan Ltd.). Furthermore, they were mixed to produce a clear hard coating composition having a solid concentration of 36%.

Formation of Antiglare Hard Coat Layer

A coating composition for forming an antiglare layer was applied onto one side of a three-layer (PMMA/PC/PMMA) sheet formed of PMMA and PC having a thickness of 1.0 mm (trade name: MT3LTR, produced by Kuraray Co., Ltd.). After drying at 65° C. for 4 minutes to volatilize the solvent, it was cured by ultraviolet irradiation treatment with an integral dose of 80 mJ/cm$^2$ to obtain an antiglare hard coat layer having a thickness of 5 µm.

Formation of Clear Hard Coat Layer

A clear hard coating composition was applied to a part of the obtained antiglare hard coat layer by inkjet to have the thickness after curing shown in the following table (that is, three thicknesses of 0.3 µm, 0.6 µm and 1.0 µm). After drying at 65° C. for 4 minutes to volatilize the solvent, it was cured by ultraviolet irradiation treatment with an integral dose of 500 mJ/cm$^2$ to form a clear hard coat layer.

The composition was applied to a target part in accordance with the design prepared in advance.

Thus, an optical laminated member in which a clear hard coat layer was laminated on a part of the antiglare hard coat layer was obtained.

Example 2

A reactor containing 7.96 parts of methyl isobutyl ketone, 28.20 parts of isopropyl alcohol and 16.80 parts of isobutanol was charged with 34.72 parts of M-402 (produced by Toagosei Co., Ltd., polyfunctional acrylate monomer mixture mainly composed of dipentaerythritol penta and hexaacrylate) as the first component,
10.06 parts of an unsaturated double bond-containing acrylic copolymer as the second component and
2.26 parts of a photopolymerization initiator (trade name: Irgacure 184, produced by BASF Japan Ltd.). Furthermore, they were mixed to produce a coating composition for forming an antiglare layer having a solid concentration of 40%.

Using the obtained coating composition for forming an antiglare layer, an antiglare hard coat layer was formed in the same manner as in Example 1.

Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Example 3

A reactor containing 4.43 parts of methyl isobutyl ketone, 28.20 parts of isopropyl alcohol and 16.80 parts of isobutanol was charged with 33.21 parts of M-402 (produced by Toagosei Co., Ltd., polyfunctional acrylate monomer mixture mainly composed of dipentaerythritol penta and hexaacrylate) as the first component,
15.09 parts of an unsaturated double bond-containing acrylic copolymer as the second component and
2.26 parts of a photopolymerization initiator (trade name: Irgacure 184, produced by BASF Japan Ltd.) to produce a coating composition for forming an antiglare layer having a solid concentration of 40%.

Using the obtained coating composition for forming an antiglare layer, an antiglare hard coat layer was formed in the same manner as in Example 1.

Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Example 4

A reactor containing 15 parts of methyl isobutyl ketone, 28.20 parts of isopropyl alcohol and 16.80 parts of isobutanol was charged with 36.60 parts of M-402 (produced by Toagosei Co., Ltd., polyfunctional acrylate monomer mixture mainly composed of dipentaerythritol penta and hexaacrylate) as a radiation-curable component, 1.13 parts of acrylic particles having an average particle diameter of 1.50 μm (trade name: SSX-101, produced by Sekisui Plastics Co., Ltd.), and 2.26 parts of a photopolymerization initiator (trade name: Irgacure 184, produced by BASF Japan Ltd.) to produce a coating composition for forming an antiglare layer having a solid concentration of 40%.

Using the obtained coating composition for forming an antiglare layer, an antiglare hard coat layer was formed in the same manner as in Example 1.

Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Example 5

A reactor containing 15 parts of methyl isobutyl ketone, 28.20 parts of isopropyl alcohol and 16.80 parts of isobutanol was charged with 36.60 parts of M-402 (produced by Toagosei Co., Ltd., polyfunctional acrylate monomer mixture mainly composed of dipentaerythritol penta and hexaacrylate) as a radiation-curable component, 1.13 parts of acrylic particles having an average particle diameter of 4.95 μm (trade name: SSX-105, produced by Sekisui Plastics Co., Ltd.), and 2.26 parts of a photopolymerization initiator (trade name: Irgacure 184, produced by BASF Japan Ltd.) to produce a coating composition for forming an antiglare layer having a solid concentration of 40%.

Using the obtained coating composition for forming an antiglare layer, an antiglare hard coat layer was formed in the same manner as in Example 1. Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Example 6

An optical laminated member was obtained in the same manner as in Example 3 except that the application of the composition was carried out in such a manner that the thickness of the antiglare hard coat layer was 2 μm.

Example 7

A reactor containing 9.72 parts of methyl isobutyl ketone, 28.20 parts of isopropyl alcohol and 16.80 parts of isobutanol was charged with 35.47 parts of M-402 (produced by Toagosei Co., Ltd., polyfunctional acrylate monomer mixture mainly composed of dipentaerythritol penta and hexaacrylate) as the first component, 7.55 parts of an unsaturated double bond-containing acrylic copolymer as the second component, and 2.26 parts of a photopolymerization initiator (trade name: Irgacure 184, produced by BASF Japan Ltd.) to produce a coating composition for forming an antiglare layer having a solid concentration of 40%.

Using the obtained coating composition for forming an antiglare layer, an antiglare hard coat layer having the thickness shown in the following table was formed in the same manner as in Example 1.

Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Example 8

A reactor containing 10.60 parts of methyl isobutyl ketone, 28.20 parts of isopropyl alcohol and 16.80 parts of isobutanol was charged with 35.85 parts of M-402 (produced by Toagosei Co., Ltd., polyfunctional acrylate monomer mixture mainly composed of dipentaerythritol penta and hexaacrylate) as the first component, 6.29 parts of an unsaturated double bond-containing acrylic copolymer as the second component, and 2.26 parts of a photopolymerization initiator (trade name: Irgacure 184, produced by BASF Japan Ltd.) to produce a coating composition for forming an antiglare layer having a solid concentration of 40%.

Using the obtained coating composition for forming an antiglare layer, an antiglare hard coat layer was formed in the same manner as in Example 1.

Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Example 9

A reactor containing 7.99 parts of methyl isobutyl ketone, 28.20 parts of isopropyl alcohol and 16.80 parts of isobutanol was charged with 34.55 parts of M-402 (produced by Toagosei Co., Ltd., polyfunctional acrylate monomer mixture mainly composed of dipentaerythritol penta and hexaacrylate) as the first component, 6.29 parts of an unsaturated double bond-containing acrylic copolymer as the second component, 2.25 parts of a photopolymerization initiator (trade name: Irgacure 184, produced by BASF Japan Ltd.) and 0.19 parts of a leveling agent (BYK-UV3500 produced by BYK Japan KK) to produce a coating composition for forming an antiglare layer having a solid concentration of 40%.

Using the obtained coating composition for forming an antiglare layer, an antiglare hard coat layer was formed in the same manner as in Example 1. Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Example 10

A reactor containing 8.02 parts of methyl isobutyl ketone, 28.20 parts of isopropyl alcohol and 16.80 parts of isobutanol was charged with 34.39 parts of M-402 (produced by Toagosei Co., Ltd., polyfunctional acrylate monomer mixture mainly composed of dipentaerythritol penta and hexaacrylate) as the first component, 6.29 parts of an unsaturated double bond-containing acrylic copolymer as the second component, 2.24 parts of a photopolymerization initiator (trade name: Irgacure 184, produced by BASF Japan Ltd.) and 0.37 parts of a leveling agent (Additive 67 produced by Dow Corning Toray Co., Ltd.) to produce a coating composition for forming an antiglare layer having a solid concentration of 40%.

Using the obtained coating composition for forming an antiglare layer, an antiglare hard coat layer was formed in the same manner as in Example 1.

Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Example 11

To 100 parts of the clear hard coating composition produced in Example 1 (solid concentration: 36%) was added 20 parts of a diluting solvent (mixed solvent of methyl isobutyl ketone/isobutanol=30/70), thereby producing a clear hard coating composition having a solid concentration of 30%.

An optical laminated member was obtained in the same manner as in Example 2 except that the obtained clear hard coating composition in this Example was used.

Example 12

94.34 parts of M-402 (produced by Toagosei Co., Ltd., polyfunctional acrylate monomer mixture mainly composed of dipentaerythritol penta and hexaacrylate) as a radiation-curable component and 5.66 parts of a photopolymerization initiator (trade name: Irgacure 184, produced by BASF Japan Ltd.) were mixed to produce a clear hard coating composition. The obtained clear hard coating composition had a solid concentration of 100%. An optical laminated member was obtained in the same manner as in Example 2 except that the obtained clear hard coating composition in this Example was used.

Comparative Example 1

A reactor containing 14.12 parts of methyl isobutyl ketone, 28.20 parts of isopropyl alcohol and 16.80 parts of isobutanol was charged with 37.36 parts of M-402 (produced by Toagosei Co., Ltd., polyfunctional acrylate monomer mixture mainly composed of dipentaerythritol penta and hexaacrylate) as the first component, 1.26 parts of an unsaturated double bond-containing acrylic copolymer as the second component and 2.26 parts of a photopolymerization initiator (trade name: Irgacure 184, produced by BASF Japan Ltd.) to produce a coating composition for forming an antiglare layer having a solid concentration of 40%.

Using the obtained coating composition for forming an antiglare layer, an antiglare hard coat layer was formed in the same manner as in Example 1.

Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Comparative Example 2

A reactor containing 2.67 parts of methyl isobutyl ketone, 28.20 parts of isopropyl alcohol and 16.80 parts of isobutanol was charged with 32.45 parts of M-402 (produced by Toagosei Co., Ltd., polyfunctional acrylate monomer mixture mainly composed of dipentaerythritol penta and hexaacrylate), 17.61 parts of an unsaturated double bond-containing acrylic copolymer as a second component and 2.26 parts of a photopolymerization initiator (trade name: Irgacure 184, produced by BASF Japan Ltd.) to produce a coating composition for forming an antiglare layer having a solid concentration of 40%.

Using the obtained coating composition for forming an antiglare layer, an antiglare hard coat layer was formed in the same manner as in Example 1.

Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Comparative Example 3

A reactor containing 15.00 parts of methyl isobutyl ketone, 28.20 parts of isopropyl alcohol and 16.80 parts of isobutanol was charged with 35.85 parts of M-402 (produced by Toagosei Co., Ltd., polyfunctional acrylate monomer mixture mainly composed of dipentaerythritol penta and hexaacrylate) as the first component, 1.89 parts of acrylic particles having an average particle diameter of 4.95 μm (trade name: SSX-105, produced by Sekisui Plastics Co., Ltd.) and 2.26 parts of a photopolymerization initiator (trade name: Irgacure 184, produced by BASF Japan Ltd.) to produce a coating composition for forming an antiglare layer having a solid concentration of 40%.

Using the obtained coating composition for forming an antiglare layer, an antiglare hard coat layer was formed in the same manner as in Example 1.

Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Comparative Example 4

A reactor containing 7.96 parts of methyl isobutyl ketone, 28.20 parts of isopropyl alcohol and 16.80 parts of isobutanol was charged with 34.72 parts of M-402 (produced by Toagosei Co., Ltd., polyfunctional acrylate monomer mixture mainly composed of dipentaerythritol penta and hexaacrylate) as the first component, 10.06 parts of an unsaturated double bond-containing acrylic copolymer as the second component and 2.26 parts of a photopolymerization initiator (trade name: Irgacure 184, produced by BASF Japan Ltd.) to produce a coating composition for forming an antiglare layer having a solid concentration of 40%.

Using the obtained coating composition for forming an antiglare layer, an antiglare hard coat layer having the thickness shown in the following table was formed in the same manner as in Example 1.

Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Comparative Example 5

A reactor containing 12.36 parts of methyl isobutyl ketone, 28.20 parts of isopropyl alcohol and 16.80 parts of isobutanol was charged with 36.60 parts of M-402 (produced by Toagosei Co., Ltd., polyfunctional acrylate monomer mixture mainly composed of dipentaerythritol penta and hexaacrylate) as the first component,
3.77 parts of an unsaturated double bond-containing acrylic copolymer as the second component and
2.26 parts of a photopolymerization initiator (trade name: Irgacure 184, produced by BASF Japan Ltd.) to produce a coating composition for forming an antiglare layer having a solid concentration of 40%.

Using the obtained coating composition for forming an antiglare layer, an antiglare hard coat layer having the thickness shown in the following table was formed in the same manner as in Example 1.

Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Comparative Example 6

A reactor containing 15.00 parts of methyl isobutyl ketone, 28.20 parts of isopropyl alcohol and 16.80 parts of isobutanol was charged with 32.08 parts of M-402 (produced by Toagosei Co., Ltd., polyfunctional acrylate monomer mixture mainly composed of dipentaerythritol penta and hexaacrylate) as the first component,
5.66 parts of acrylic particles having an average particle diameter of 1.50 μm (trade name: SSX-101, produced by Sekisui Plastics Co., Ltd.) and
2.26 parts of a photopolymerization initiator (trade name: Irgacure 184, produced by BASF Japan Ltd.) to produce a coating composition for forming an antiglare layer having a solid concentration of 40%.

Using the obtained coating composition for forming an antiglare layer, an antiglare hard coat layer was formed in the same manner as in Example 1.

Subsequently, the clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

The following Examples 13 to 18 are experimental examples in each of which a coating composition for forming an antiglare layer containing a polymerizable unsaturated group-containing binder component was applied, the composition was then cured with a mold base having a bumpy shape on its surface being kept in bumpy shape surface contact with the obtained uncured coating layer.

Subsequently, the mold base was removed, and thus an antiglare hard coat layer having continuous random irregularities on its surface was formed.

Example 13

Preparation of Mold Base a Having Bumpy Shape on its Surface

A reactor containing 13.24 parts of methyl isobutyl ketone, 28.20 parts of isopropyl alcohol and 16.80 parts of isobutanol was charged with 36.98 parts of M-402 (produced by Toagosei Co., Ltd., polyfunctional acrylate monomer mixture mainly composed of dipentaerythritol penta and hexaacrylate) as the first component,
2.52 parts of the unsaturated double bond-containing acrylic copolymer of Preparation Example 1 as the second component and
2.26 parts of a photopolymerization initiator (trade name: OMNIRAD184, produced by IGM RESINS) to produce a coating composition for forming a mold base having a solid concentration of 40%.

The coating composition for forming a mold base was applied to one side of a PET film having a thickness of 75 μm (trade name: Lumirror U48, produced by Toray Industries, Inc.). After drying at 65° C. for 4 minutes to volatilize the solvent, it was cured by ultraviolet irradiation treatment with an integral dose of 1500 mJ/cm² to obtain mold base A with a thickness of 5 μm having a bumpy shape on its surface.

Production of Coating Composition for Forming Antiglare Layer

To a vessel were added 29.84 parts of propylene glycol monomethyl ether, 11.12 parts of ethyl acetate, 11.12 parts of butyl acetate,
22.24 parts of ARONIX M-402 (produced by Toagosei Co., Ltd., polyfunctional acrylate monomer mixture mainly composed of dipentaerythritol penta and hexaacrylate), 11.12 parts of UNIDIC V-6850 (produced by DIC Corporation, acrylic (meth)acrylate oligomer or polymer),
0.98 parts of OMNIRAD184 (produced by IGM Resins, photopolymerization initiator, 1-hydroxycyclohexyl phenyl ketone), 1.31 parts of OMNIRAD TPO (produced by IGM Resins, photopolymerization initiator, 2,4,6-trimethylbenzoyldiphenylphosphine oxide) and
12.27 parts of MIBK-AC-2140Z (produced by Nissan Chemical Corporation) were added, mixed and stirred to prepare hard coating composition 3 in such a manner that the composition had a solid concentration of 35%.

Formation of Antiglare Hard Coat Layer

A coating composition for forming an antiglare layer was applied onto one side of a three-layer (PMMA/PC/PMMA) sheet formed of PMMA (polymethyl methacrylate) and PC (polycarbonate) having a thickness of 1.0 mm (trade name: MT3LTR, produced by Kuraray Co., Ltd.). After drying at 65° C. for 4 minutes to volatilize the solvent, the bumpy surface of the mold base A was laminated to the dried coating film surface of the applied composition, and then the composition was cured by ultraviolet irradiation treatment with an integral dose of 140 mJ/cm². Subsequently, the mold base A was removed to obtain an antiglare hard coat layer having a thickness of 5 μm.

Formation of Clear Hard Coat Layer

The clear hard coating composition produced in Example 1 was applied to a part of the obtained antiglare hard coat layer by inkjet to have the thickness after curing shown in the following table. Subsequently, curing was carried out in the same manner as in Example 1 to form a clear hard coat layer and obtain an optical laminated member.

Example 14

A reactor containing 7.96 parts of methyl isobutyl ketone, 28.20 parts of isopropyl alcohol and 16.80 parts of isobutanol was charged with 34.72 parts of M-402 (produced by Toagosei Co., Ltd., polyfunctional acrylate monomer mixture mainly composed of dipentaerythritol penta and hexaacrylate) as the first component,
10.06 parts of an unsaturated double bond-containing acrylic copolymer as the second component and
2.26 parts of a photopolymerization initiator (trade name: Irgacure 184, produced by BASF Japan Ltd.) to produce a coating composition for forming a mold base having a solid concentration of 40%.

Using the obtained coating composition for forming a mold base, mold base B having a bumpy shape on its surface was prepared by the same procedures as in Example 13.

An antiglare hard coat layer and a clear hard coat layer were formed in the same procedures as in Example 13 by using the resulting mold base material B and the coating composition for forming an antiglare layer produced in Example 13, and thus an optical laminated member was obtained.

Example 15

A reactor containing 4.43 parts of methyl isobutyl ketone, 28.20 parts of isopropyl alcohol and 16.80 parts of isobutanol was charged with 33.21 parts of M-402 (produced by Toagosei Co., Ltd., polyfunctional acrylate monomer mixture mainly composed of dipentaerythritol penta and hexaacrylate) as the first component,
15.09 parts of an unsaturated double bond-containing acrylic copolymer as the second component and
2.26 parts of a photopolymerization initiator (trade name: Irgacure 184, produced by BASF Japan Ltd.) to produce a coating composition for forming a mold base having a solid concentration of 40%.

Using the obtained coating composition for forming a mold base, mold base C having a bumpy shape on its surface was prepared by the same procedures as in Example 13.

An antiglare hard coat layer and a clear hard coat layer were formed in the same procedures as in Example 13 by using the resulting mold base material C and the coating composition for forming an antiglare layer produced in Example 13, and thus an optical laminated member was obtained.

Example 16

Preparation of Mold Base D Having Bumpy Shape on its Surface

A reactor containing 15.00 parts of methyl isobutyl ketone, 28.20 parts of isopropyl alcohol and 16.80 parts of isobutanol was charged with 36.60 parts of M-402 (produced by Toagosei Co., Ltd., polyfunctional acrylate monomer mixture mainly composed of dipentaerythritol penta and hexaacrylate),
1.13 parts of acrylic particles having an average particle diameter of 1.50 μm (trade name: SSX-101, produced by Sekisui Plastics Co., Ltd.) and
2.26 parts of a photopolymerization initiator (trade name: OMNIRAD184, produced by IGM RESIN) to produce a coating composition for forming a mold base having a solid concentration of 40%.

The coating composition for forming a mold base was applied to one side of a PET film having a thickness of 75 μm (trade name: Lumirror U48, produced by Toray Industries, Inc.). After drying at 65° C. for 4 minutes to volatilize the solvent, it was cured by ultraviolet irradiation treatment with an integral dose of 1500 mJ/cm² to obtain mold base D with a thickness of 5 μm having a bumpy shape on its surface.

An antiglare hard coat layer and a clear hard coat layer were formed in the same procedures as in Example 13 by using the resulting mold base material D and the coating composition for forming an antiglare layer produced in Example 13, and thus an optical laminated member was obtained.

Example 17

Preparation of Mold Base Material E Having Bumpy Shape on its Surface

A reactor containing 15.00 parts of methyl isobutyl ketone, 28.20 parts of isopropyl alcohol and 16.80 parts of isobutanol was charged with 36.60 parts of M-402 (produced by Toagosei Co., Ltd., polyfunctional acrylate monomer mixture mainly composed of dipentaerythritol penta and hexaacrylate),
1.13 parts of acrylic particles having an average particle diameter of 4.95 μm (trade name: SSX-105, produced by Sekisui Plastics Co., Ltd.) and
2.26 parts of a photopolymerization initiator (trade name: OMNIRAD184, produced by IGM RESIN) to produce a coating composition for forming an antiglare layer having a solid concentration of 40%.

The coating composition for forming an antiglare layer was applied to one side of a PET film having a thickness of 75 μm (trade name: Lumirror U48, produced by Toray Industries, Inc.). After drying at 65° C. for 4 minutes to volatilize the solvent, it was cured by ultraviolet irradiation treatment with an integral dose of 1500 mJ/cm² to obtain mold base E with a thickness of 5 μm having a bumpy shape on its surface.

An antiglare hard coat layer and a clear hard coat layer were formed in the same procedures as in Example 13 by using the resulting mold base material E and the coating composition for forming an antiglare layer produced in Example 13, and thus an optical laminated member was obtained.

Example 18

Preparation of Mold Base F Having Bumpy Shape on its Surface

A polypropylene film having a thickness of 75 μm (trade name: TORAYFAN ZK-207, produced by Toray Advanced Film Co., Ltd.) was used as a mold base.

An antiglare hard coat layer and a clear hard coat layer were formed in the same procedures as in Example 13 by using the mold base material F and the coating composition for forming an antiglare layer produced in Example 13, and thus an optical laminated member was obtained.

The evaluations described below were carried out using the optical laminated members obtained in the above examples and comparative examples and the coating compositions used for the preparation of the optical laminated members. The results of the evaluations are shown in the following tables.

Method of Haze Value Measurement

The haze value (total haze value) Ha of an antiglare hard coat layer and the haze value (total haze value) Hm of a part where a clear hard coat layer was laminated on an antiglare hard coat layer were measured with a haze meter (NDH 2000 produced by Nippon Denshoku Industries Co., Ltd.) by a method in accordance with JIS K7136.

The haze value (total haze value) Ha of an antiglare hard coat layer was measured by cutting out a test sample provided with an antiglare hard coat layer on a substrate into a size of 50 mm×50 mm and setting the sample in a sample chamber. The measurement conditions were set to "Method 3".

The haze value (total haze value) Hm of a part where clear hard coat layer was laminated on an antiglare hard coat layer was measured by cutting out a test sample provided with a clear hard coat layer laminated on an antiglare hard coat layer into a size of 50 mm×50 mm and setting the sample in a sample chamber. The measurement conditions were set to "Method 3".

Method of Internal Haze Value Measurement

A test sample of an antiglare hard coat layer was cut into 50 mm×50 mm. 0.01 ml of glycerin (special grade reagent, produced by Kishida Chemical Co., Ltd.) was dropped onto a bumpy surface of the coating film of the test sample, and then a glass plate (18 mm×18 mm, produced by Matsunami Glass Ind., Ltd.) was placed thereon to prepare a test piece with surface irregularities crushed. Using the above-mentioned haze meter, the internal haze value Hi of the antiglare hard coat layer was measured by a method in accordance with JIS K7136. The measurement conditions were set to Method 3.

The internal haze value of the part where the clear hard coat layer was laminated on the antiglare hard coat layer was also measured in the same manner as described above.

Method of Film Thickness Measurement

A test sample was cut into a size of 10 mm×10 mm, and a cross section sample of the coating film was prepared with a microtome (LEICA RM 2265). The prepared cross section was observed with a laser microscope (VK 8700 produced by KEYENCE) and the film thickness was measured.

In the measurement of the thickness of the antiglare hard coat layer, the thickness was determined by measuring the thickness of the layer at 10 concave portions and 10 convex portions by the above-described method and calculating the average value thereof.

In measuring the thickness of the clear hard coat layer, the thickness was determined by measuring the thickness of the layer at 10 points by the above-described method and calculating the average value thereof.

Method of $Rz_{jis}$ Measurement

A test sample was cut into a size of 50 mm×50 mm and measured in accordance with JIS B0601; 2001 with a laser microscope (VK 8700 produced by KEYECE) having an eyepiece magnification of 20 times and an objective lens magnification of 50 times to obtain an $Rz_{jis}$ value.

Method of Surface Free Energy Evaluation

A test sample of an antiglare hard coat layer was cut into a size of 50 mm×50 mm and evaluated using a wetting reagent (wetting index standard solution produced by Nacalai Tesque, Inc.) at an environmental temperature of 25° C. to obtain a surface free energy value.

Method of Measuring Contact Angle of Clear Hard Coating Composition

A test sample of an antiglare hard coat layer was cut into a size of 50 mm×50 mm. A clear hard coating composition was filled in a syringe. At an environmental temperature of 25° C., 2 μl of the composition was dropped from the syringe onto the test sample of the antiglare hard coat layer. Using an automatic contact angle meter (DSA20 produced by KRUSS), the contact angle was measured by image processing in accordance with JIS R3257.

Method of Viscosity Measurement 100 ml of a coating composition for measuring the viscosity thereof was held at a temperature of 20° C. and the viscosity was measured with a B type viscometer (TVB-22L produced by Toki Sangyo Co., Ltd.). The measurement condition was set to 60 rpm using an M1 Roter.

Method of Transparency Evaluation

A part where a clear hard coat layer (the thickness of the clear hard coat layer: the thickness indicated in the following table in the column "thickness of clear hard coat layer (ratio to Rzjis:100%)") was laminated on an antiglare hard coat layer was cut out into a size of 50 mm×50 mm and was judged on the basis of the internal haze measurement value thereof.

○: The internal haze value was 2.0% or less.
x: The internal haze value was 2.1% or more.

Method of Adhesion Evaluation

An adhesion test was carried out in accordance with JIS K5400 using the test piece used in the above "Method of Transparency Evaluation". A part where a clear hard coat layer was laminated on an antiglare hard coat layer was subjected to cross cutting with a cutter knife so as to have 100 pieces of cut squares (grid pattern) with an area of 1 mm². Then, a cellophane pressure-sensitive adhesive tape (Lpack LP-24, 24 mm×35 m, produced by Nichiban Co., Ltd.) was completely stuck on the prepared grid pattern and one end of the tape was pulled upward and peeled off. This peeling operation was performed three times on a same part. Afterward, the number of the squares peeled off was judged according to the following criteria.

10: There was no square peeled off.
8: There were not more than 5 squares peeled off.
6: There are more than 5 and not more than 15 squares peeled off.
4: There are more than 15 and not more than 35 squares peeled off.
2: There are more than 35 and not more than 65 squares peeled off.
0: There are more than 65 and not more than 100 squares peeled off.

Method of Smoothness Evaluation

An evaluation test was carried out using the test pieces used in the above "Method of Transparency Evaluation". A part where a clear hard coat layer was laminated on an antiglare hard coat layer was cut into a size of 50 mm×50 mm and was evaluated visually based on the following criteria.

○: The antiglare hard coat layer had no irregularities and the layer was smooth.
Δ: Slight irregularities of the antiglare hard coat layer were observed.
x: An antiglare property derived from irregularities of the antiglare hard coat layer was confirmed.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Coating composition for forming antiglare layer | ARONIX M-402 | | 98.0 | 92.0 | 88.0 | 97.0 | 97.0 | 88.0 | 94.0 | 95.0 | 92.0 |
| | SSX-101 | 1.50 μm | | | | | 3.0 | | | | |
| | SSX-105 | 4.95 μm | | | | | | 3.0 | | | |
| | Leveling agent | BYK-UV3500 | | | | | | | | | |
| | | Additive 67 | | | | | | | | | 0.05 |
| | Unsaturated double bond-containing copolymer | | 2.0 | 8.0 | 12.0 | | | 12.0 | 6.0 | 5.0 | 8.0 |
| | Total | | 100.0 | 100.0 | 100.0 | 100.0 | 100.0 | 100.0 | 100.0 | 100.0 | 100.1 |
| Antiglare hard coat layer | Haze value Ha | (%) | 2.8 | 20.4 | 40.1 | 10.6 | 22.1 | 21.7 | 20.4 | 18.9 | 19.5 |
| | Internal haze value Hi | (%) | 0.3 | 0.5 | 0.4 | 1.2 | 1.8 | 0.4 | 0.3 | 0.5 | 0.4 |
| | Thickness | (μm) | 5 | 5 | 5 | 5 | 5 | 2 | 7 | 5 | 5 |
| | Rzjis | (μm) | 1.0 | 1.1 | 1.3 | 1.0 | 1.0 | 1.0 | 1.8 | 0.3 | 1.0 |
| | Surface free energy | (mN/m) | 46 | 46 | 46 | 46 | 46 | 46 | 46 | 46 | 30 |
| | Contact angle of clear | (°) | 30 | 30 | 30 | 30 | 30 | 30 | 30 | 30 | 48 |
| Clear hard coating composition | Viscosity | (mPa * s) | 10 | 10 | 10 | 10 | 10 | 10 | 10 | 10 | 10 |
| Thickness of clear hard coat layer (ratio to Rzjis: 30%) | Haze value Hm | (%) | 1.2 | 15.4 | 29.5 | 7.4 | 14.8 | 14.5 | 13.9 | 13.8 | 14.5 |
| | Internal haze value | (%) | 0.3 | 0.3 | 0.3 | 1.0 | 1.8 | 0.3 | 0.3 | 0.3 | 0.3 |
| | Thickness | (μm) | 0.30 | 0.33 | 0.39 | 0.30 | 0.30 | 0.30 | 0.54 | 0.09 | 0.30 |
| | Haze change rate | (%) | 57 | 25 | 26 | 30 | 33 | 33 | 32 | 27 | 26 |
| Thickness of clear hard coat layer (ratio to Rzjis: 60%) | Haze value Hm | (%) | 0.8 | 11.5 | 17.6 | 3.8 | 10.3 | 8.7 | 9.1 | 10.5 | 9.7 |
| | Internal haze value | (%) | 0.3 | 0.3 | 0.3 | 1.0 | 1.8 | 0.3 | 0.3 | 0.3 | 0.3 |
| | Thickness | (μm) | 0.6 | 0.66 | 0.78 | 0.6 | 0.6 | 0.6 | 1.08 | 0.18 | 0.6 |
| | Haze change rate | (%) | 71 | 44 | 56 | 64 | 53 | 60 | 55 | 44 | 50 |
| Thickness of clear hard coat layer (ratio to Rzjis: 100%) | Haze value Hm | (%) | 0.5 | 0.8 | 0.8 | 1.7 | 2.4 | 0.8 | 0.8 | 0.8 | 0.8 |
| | Internal haze value | (%) | 0.3 | 0.3 | 0.3 | 1.0 | 1.8 | 0.3 | 0.3 | 0.3 | 0.3 |
| | Thickness | (μm) | 1.0 | 1.1 | 1.3 | 1.0 | 1.0 | 1.0 | 1.8 | 0.3 | 1.0 |
| | Haze change rate | (%) | 82 | 96 | 98 | 84 | 89 | 96 | 96 | 96 | 96 |
| Evaluation | Transparency | (Rating) | ○ | ○ | ○ | ○ | ○ | ○ | ○ | ○ | ○ |
| | Adhesion | (Rating) | ○ | ○ | ○ | ○ | ○ | ○ | ○ | ○ | ○ |
| | Smoothness | (Visual) | ○ | ○ | ○ | ○ | ○ | ○ | ○ | ○ | ○ |

TABLE 2

| | | | Example 10 | Example 11 | Example 12 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Coating composition for forming antiglare layer | ARONIX M-402 | | 92.0 | 92.0 | 92.0 | 99.0 | 84.0 | 95.0 | 92.0 | 97.0 | 85.0 |
| | SSX-101 | 1.50 μm | | | | | | | | | 15.0 |
| | SSX-105 | 4.95 μm | | | | | | 5.0 | | | |
| | Leveling agent | BYK-UV3500 | | | | | | | | | |
| | | Additive 67 | 1.0 | | | | | | | | |
| | Unsaturated double bond-containing copolymer | | 8.0 | 8.0 | 8.0 | 1.0 | 16.0 | | 8.0 | 3.0 | |
| | Total | | 101.0 | 100.0 | 100.0 | 100.0 | 100.0 | 100.0 | | 100.0 | 100.0 |
| Antiglare hard coat layer | Haze value Ha | (%) | 18.2 | 22.5 | 23.1 | 0.5 | 65.1 | 23.9 | 0.5 | 19.5 | 18.1 |
| | Internal haze value Hi | (%) | 0.3 | 0.5 | 0.6 | 0.3 | 0.6 | 5.2 | 0.5 | 0.6 | 15 |
| | Thickness | (μm) | 5 | 5 | 5 | 5 | 5 | 5 | 0.5 | 15 | 5 |
| | Rzjis | (μm) | 1.0 | 1.0 | 1.0 | 1.0 | 3.5 | 1.0 | 1.0 | 3.0 | 0.05 |
| | Surface free energy | (mN/m) | 50 | 46 | 46 | 46 | 46 | 46 | 46 | 46 | 46 |
| | Contact angle of clear | (°) | 11 | 10 | 60 | 30 | 30 | 30 | 30 | 30 | 30 |
| Clear hard coating composition | Viscosity | (mPa * s) | 10 | 5 | 1500 | 10 | 10 | 10 | 10 | 10 | 10 |
| Thickness of clear hard coat layer (ratio to Rzjis: 30%) | Haze value Hm | (%) | 13.4 | 15.3 | 15.4 | 0.5 | 45.6 | 16.4 | 0.5 | 15.7 | 17.4 |
| | Internal haze value | (%) | 0.3 | 0.3 | 0.3 | 0.3 | 0.3 | 5.0 | 0.3 | 0.3 | 15.0 |
| | Thickness | (μm) | 0.30 | 0.30 | 0.30 | 0.30 | 1.05 | 0.30 | 0.30 | 0.90 | 0.02 |
| | Haze change rate | (%) | 26 | 32 | 33 | 0 | 30 | 31 | 0 | 19 | 4 |

TABLE 2-continued

|  |  |  | Example 10 | Example 11 | Example 12 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Thickness of clear hard coat layer (ratio to Rzjis: 60%) | Haze value Hm | (%) | 10.6 | 9.8 | 10.4 | 0.5 | 10.4 | 9.5 | 0.5 | 8.6 | 16.8 |
|  | Internal haze value | (%) | 0.3 | 0.3 | 0.3 | 0.3 | 0.3 | 5.0 | 0.3 | 0.3 | 15.0 |
|  | Thickness | (μm) | 0.6 | 0.6 | 0.6 | 0.6 | 2.1 | 0.6 | 0.6 | 1.8 | 0.03 |
|  | Haze change rate | (%) | 42 | 56 | 55 | 0 | 84 | 60 | 0 | 56 | 7 |
| Thickness of clear hard coat layer (ratio to Rzjis: 100%) | Haze value Hm | (%) | 0.8 | 0.8 | 0.8 | 0.5 | 5.0 | 6.0 | 0.5 | 1.2 | 16.0 |
|  | Internal haze value | (%) | 0.3 | 0.3 | 0.3 | 0.3 | 0.3 | 5.0 | 0.3 | 0.3 | 15.0 |
|  | Thickness | (μm) | 1.0 | 1.0 | 1.0 | 1.0 | 3.5 | 1.0 | 1.0 | 3.0 | 0.1 |
|  | Haze change rate | (%) | 96 | 96 | 97 | 0 | 92 | 75 | 0 | 94 | 12 |
| Evaluation | Transparency | (Rating) | ○ | ○ | ○ | ○ | ○ | x | ○ | ○ | x |
|  | Adhesion | (Rating) | ○ | ○ | ○ | ○ | ○ | ○ | ○ | ○ | ○ |
|  | Smoothness | (Visual) | ○ | ○ | ○ | ○ | x | x | ○ | x | x |

TABLE 3

|  |  |  | Example 13 Mold base A | Example 14 Mold base B | Example 15 Meld base C | Example 16 Mold base D | Example 17 Mold base E | Example 18 Mold base F |
|---|---|---|---|---|---|---|---|---|
| Mold base | Hz | (%) | 2.8 | 20.4 | 40.1 | 10.8 | 22.1 | 46.5 |
|  | Rzjis | (μm) | 1.0 | 1.0 | 1.0 | 1.0 | 1.0 | 0.9 |
| Antiglare hard coat layer | Haze value Ha | (%) | 2.7 | 20.1 | 38.3 | 10.5 | 20.4 | 24.4 |
|  | Internal haze value Hi | (%) | 0.1 | 0.1 | 0.2 | 0.1 | 0.2 | 0.1 |
|  | Thickness | (μm) | 5 | 5 | 5 | 5 | 5 | 5 |
|  | Rzjis | (μm) | 0.9 | 1.0 | 1.0 | 1.0 | 1.0 | 0.9 |
|  | Surface free energy | (mN/m) | 38 | 38 | 38 | 38 | 38 | 38 |
|  | Contact angle of clear | (°) | 41 | 40 | 49 | 41 | 41 | 41 |
| Clear hard coating composition | Viscosity | (mPa * s) | 10 | 10 | 10 | 10 | 10 | 10 |
| Thickness of clear hard coat layer (ratio to Rzjis: 30%) | Haze value Hm | (%) | 1.2 | 15.2 | 28.7 | 6.8 | 14.9 | 16.8 |
|  | Internal haze value | (%) | 0.1 | 0.1 | 0.2 | 0.1 | 0.2 | 0.1 |
|  | Thickness | (μm) | 0.27 | 0.30 | 0.30 | 0.30 | 0.30 | 0.27 |
|  | Haze change rate | (%) | 56 | 24 | 25 | 35 | 27 | 31 |
| Thickness of clear hard coat layer (ratio to Rzjis: 60%)) | Haze value Hm | (%) | 0.8 | 11.3 | 16.9 | 3.9 | 10.3 | 10.9 |
|  | Internal haze value | (%) | 0.1 | 0.1 | 0.1 | 0.1 | 0.1 | 0.1 |
|  | Thickness | (μm) | 0.54 | 0.6 | 0.6 | 0.6 | 0.6 | 0.54 |
|  | Haze change rate | (%) | 70 | 44 | 56 | 63 | 50 | 55 |
| Thickness of clear hard coat layer (ratio to Rzjis: 100%) | Haze value Hm | (%) | 0.4 | 0.5 | 0.6 | 0.4 | 0.5 | 0.6 |
|  | Internal haze value | (%) | 0.1 | 0.1 | 0.2 | 0.1 | 0.1 | 0.1 |
|  | Thickness | (μm) | 0.9 | 1.0 | 1.0 | 1.0 | 1.0 | 0.9 |
|  | Haze change rate | (%) | 85 | 98 | 98 | 96 | 98 | 98 |
| Evaluation | Transparency | (Rating) | ○ | ○ | ○ | ○ | ○ | ○ |
|  | Adhesion | (Rating) | ○ | ○ | ○ | ○ | ○ | ○ |
|  | Smoothness | (Visual) | ○ | ○ | ○ | ○ | ○ | ○ |

The optical laminated members of the examples were all confirmed to be superior in transparency, adhesion and smoothness. In the optical laminated members of the examples, it was possible to effectively change the haze value of a part where a clear hard coat layer was laminated on an antiglare hard coat layer by changing the thickness of the clear hard coat layer.

Comparative Example 1 is an example in which the haze value Ha of the antiglare hard coat layer is less than 1%. In this case, it was confirmed that even though the clear hard coat layer was laminated on the antiglare hard coat layer, the haze value did not change and no technical effects of the present invention were achieved.

Comparative Example 2 is an example in which the haze value Ha of the antiglare hard coat layer exceeds 45% and the ten-point average roughness of the antiglare hard coat layer surface exceeds the range of the present invention. In this case, it was confirmed that the smoothness was inferior.

Comparative Example 3 is an example in which the internal haze value Hi of the antiglare hard coat layer exceeds 2%. In this case, it was confirmed that the transparency was inferior.

Comparative Example 4 is an example in which the thickness of the antiglare hard coat layer is less than 1 μm. In this case, the haze value Ha of the antiglare hard coat layer is less than 1%, and even though the clear hard coat layer is laminated on the antiglare hard coat layer, the haze value does not change and no technical effects of the present invention were achieved.

Comparative Example 5 is an example in which the thickness of the antiglare hard coat layer exceeds 10 μm. In this case, the ten-point average roughness of the surface of the antiglare hard coat layer exceeded the range of the present invention, resulting in inferior smoothness.

Comparative Example 6 is an example in which the internal haze value Hi of the antiglare hard coat layer exceeds 2% and the ten-point average roughness of the antiglare hard coat layer surface is less than the range of the present invention. In this case, transparency and smoothness were inferior.

INDUSTRIAL APPLICABILITY

The optical laminated member of the present invention can be used, for example, as a member which imparts antiglare performance to an image display unit of a display and improves the design property of an image non-display unit. The optical laminated member of the present invention provides superior antiglare performance in an image display unit of a display while the antiglare performance is reduced in an image non-display unit and the member can provide a design with a high quality feeling.

REFERENCE SIGNS LIST

1: Optical Laminated Member
3: Antiglare Hard Coat Layer
5: Transparent Polymer Substrate
7: Clear Hard Coat Layer
9: Decorative Layer
11: Image display unit.

The invention claimed is:
1. An optical laminated member comprising
a) an antiglare hard coat layer,
wherein the antiglare hard coat layer is a cured layer of a coating composition for forming the antiglare hard coat layer and has continuous random irregularities on its surface, and
wherein the antiglare hard coat layer has a surface having a ten-point average roughness $Rz_{JIS}$ of 0.1 μm to 2 μm,
b) a clear hard coat layer, and
c) a transparent polymer substrate,
wherein the optical laminated member has a portion where the antiglare hard coat layer and the clear hard coat layer are sequentially laminated on at least one side of the transparent polymer substrate, and
wherein the optical laminated member has a portion where the antiglare hard coat layer is laminated on the transparent polymer substrate and no clear hard coat layer is present,
wherein, in the portion having the clear hard coat layer, the clear hard coat layer is a cured layer of a clear hard coating composition,
the clear hard coat layer is laminated on a part of the antiglare hard coat layer,
the antiglare hard coat layer has a thickness of 1 μm to 10 μm,
the clear hard coat layer has a thickness of 0.01 μm to 10 μm,
the antiglare hard coat layer has a haze value Ha of 2% to 45% and an internal haze value Hi of 0.01% to 2%,
the haze value Hm of a part where the clear hard coat layer is laminated on the antiglare hard coat layer is 0.05% to 20%, and

Ha and Hm satisfy the following formulas:

$5 \leq (Ha-Hm)/Ha \times 100 \leq 99$, the antiglare hard coat layer has a surface free energy of 30 to 50 mN/m, and
a contact angle of a droplet formed when the clear hard coating composition is dropped onto the surface of the antiglare hard coat layer is within a range of 5 to 75°.
2. The optical laminated member according to claim 1, wherein the coating composition for forming the antiglare hard coat layer contains a first component and a second component, and
surface irregularities of the antiglare hard coat layer are surface irregularities derived from phase separation between the first component and the second component.
3. The optical laminated member according to claim 2, wherein the first component contains at least one species selected from polyfunctional (meth)acrylate compounds and polyfunctional urethane (meth)acrylate compounds, and
the second component is an unsaturated double bond-containing acrylic copolymer.
4. The optical laminated member according to claim 2, wherein a mass ratio of the first component to the second component is within a range of the first component: the second component=98.5:1.5 to 60:40.
5. The optical laminated member according to claim 1, wherein
a decorative layer is laminated on a side of the transparent polymer substrate that is opposite to the side of a transparent polymer substrate having the antiglare hard coat layer and the clear hard coat layer are sequentially laminated thereupon.
6. The optical laminated member according to claim 1 that is disposed in a display unit,
wherein
a side opposite to the side of the transparent polymer substrate having the antiglare hard coat layer and the clear hard coat layer are sequentially laminated thereupon or a decorative layer laminated on the side opposite to the side of the transparent polymer substrate having the antiglare hard coat layer and the clear hard coat layer are sequentially laminated thereupon is disposed so as to face a surface of the display unit.
7. The optical laminated member according to claim 1, wherein the optical laminated member is an optical laminated member for an in-vehicle device touch panel display.
8. The optical laminated member according to claim 1, wherein the coating composition for forming the antiglare hard coat layer forming an antiglare layer contains a polymerizable unsaturated group-containing binder component,
the antiglare hard coat layer is a layer on a surface of which a bumpy shape has been formed by bringing a mold base having a bumpy shape on its surface into surface contact with an uncured coating layer of the coating composition for forming the antiglare hard coat layer and then removing the mold base.
9. The optical laminated member according to claim 8, wherein the antiglare hard coat layer is a layer on a surface of which a bumpy shape has been formed by curing an uncured coating layer of the coating composition for forming the antiglare hard coat layer with a mold base having a bumpy shape on its surface being kept in surface contact with the uncured coating layer and then removing the mold base.

* * * * *